United States Patent
Shimada et al.

(10) Patent No.: US 11,199,932 B2
(45) Date of Patent: Dec. 14, 2021

(54) TOUCH DETECTION CIRCUIT WITH DETECTION OF WATER

(71) Applicant: ROHM CO., LTD., Kyoto (JP)

(72) Inventors: Yuji Shimada, Kyoto (JP); Naoki Tada, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/895,421

(22) Filed: Jun. 8, 2020

(65) Prior Publication Data

US 2020/0387249 A1     Dec. 10, 2020

(30) Foreign Application Priority Data

Jun. 7, 2019 (JP) .............................. JP2019-107232

(51) Int. Cl.
    *G06F 3/044*     (2006.01)
    *G06F 3/041*     (2006.01)

(52) U.S. Cl.
    CPC ............ *G06F 3/044* (2013.01); *G06F 3/0416* (2013.01); *G06F 3/04166* (2019.05); *G06F 3/04186* (2019.05); *G06F 3/041662* (2019.05)

(58) Field of Classification Search
    CPC ................. G06F 3/044; G06F 3/04186; G06F 3/041662; G06F 3/04166; G06F 3/0416
    See application file for complete search history.

(56) References Cited

U.S. PATENT DOCUMENTS

| | | | |
|---|---|---|---|
| 2012/0050214 A1* | 3/2012 | Kremin | G06F 3/0443 345/174 |
| 2016/0266717 A1* | 9/2016 | Oral | G06F 3/0418 |
| 2019/0227669 A1* | 7/2019 | Maharyta | G06F 3/0448 |
| 2019/0346961 A1* | 11/2019 | Wu | G06F 3/0488 |
| 2019/0369803 A1* | 12/2019 | Yang | G06F 3/0418 |

FOREIGN PATENT DOCUMENTS

| | | |
|---|---|---|
| JP | 2001325858 A | 11/2001 |
| JP | 2012182781 A | 9/2012 |

* cited by examiner

*Primary Examiner* — Liliana Cerullo
(74) *Attorney, Agent, or Firm* — Cantor Colburn LLP

(57) ABSTRACT

A touch detection circuit has a first terminal and a second terminal which are respectively coupled to a first electrode and a second electrode located adjacent to each other. The capacitance sensing circuit (i) senses first electrostatic capacitance formed by the first electrode in a space with a periphery including the second electrode, and (ii) senses, by a self-capacitance method, second electrostatic capacitance formed by the first electrode in a space with a periphery in a state where voltage of the second terminal is made to follow voltage of the first terminal. A signal processor detects water over the first electrode and the second electrode on the basis of a difference between the first electrostatic capacitance and the second electrostatic capacitance.

14 Claims, 22 Drawing Sheets

FIG. 3A
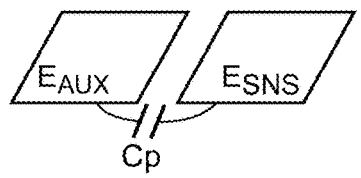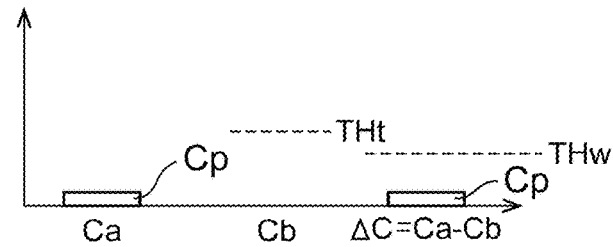
FIG. 3B
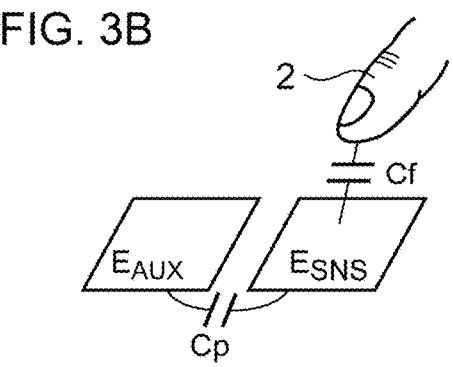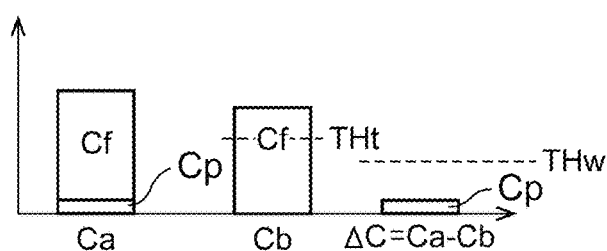
FIG. 3C
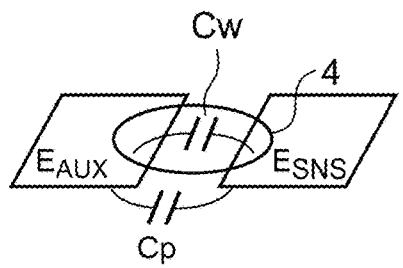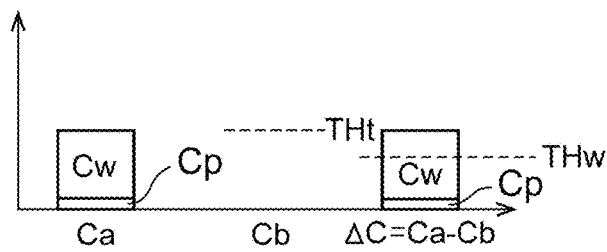
FIG. 3D
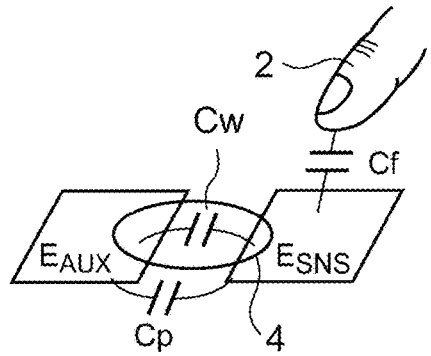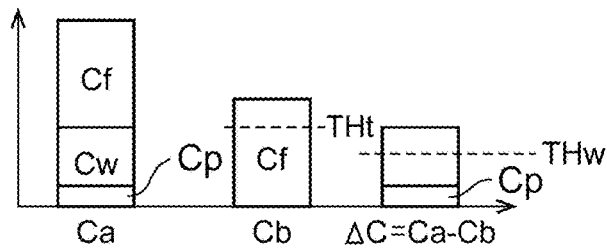

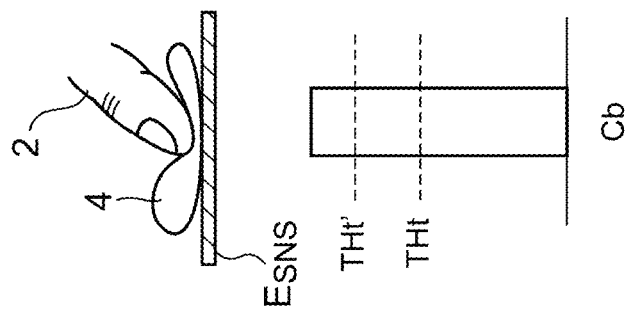
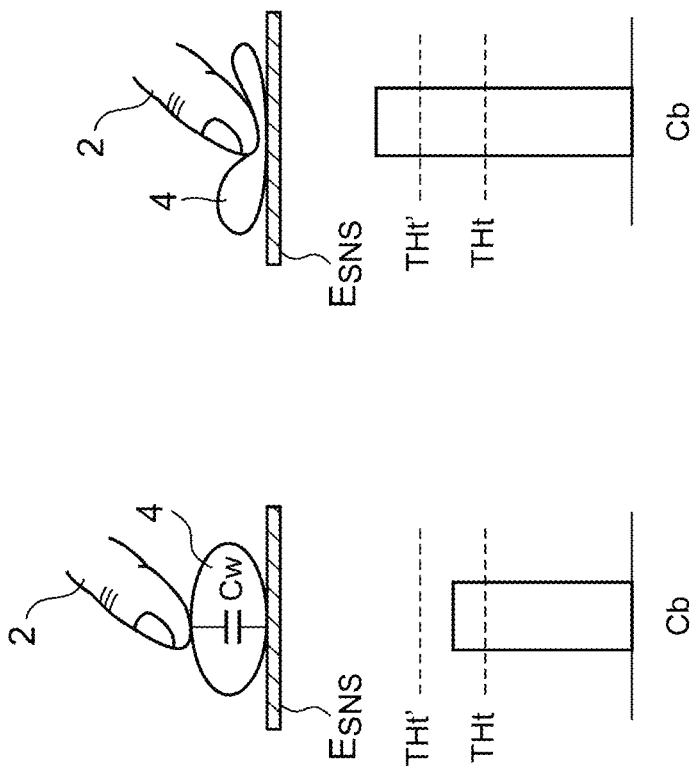
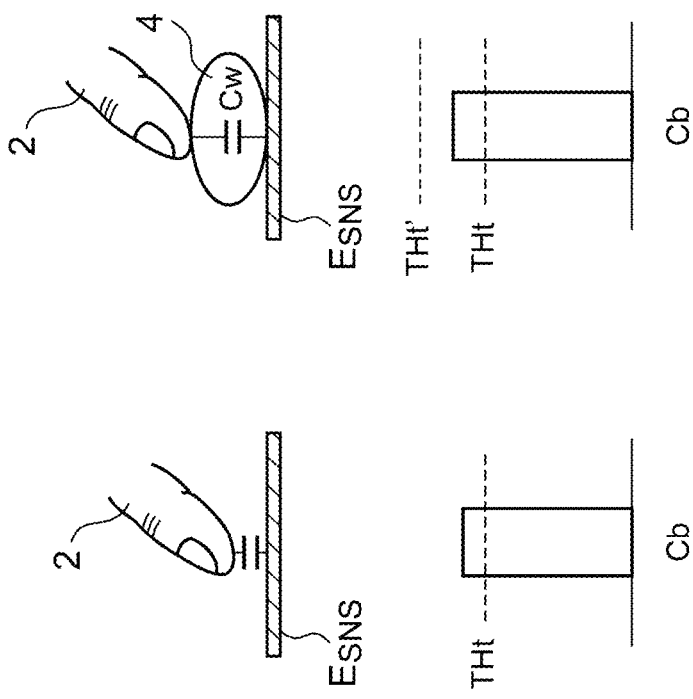
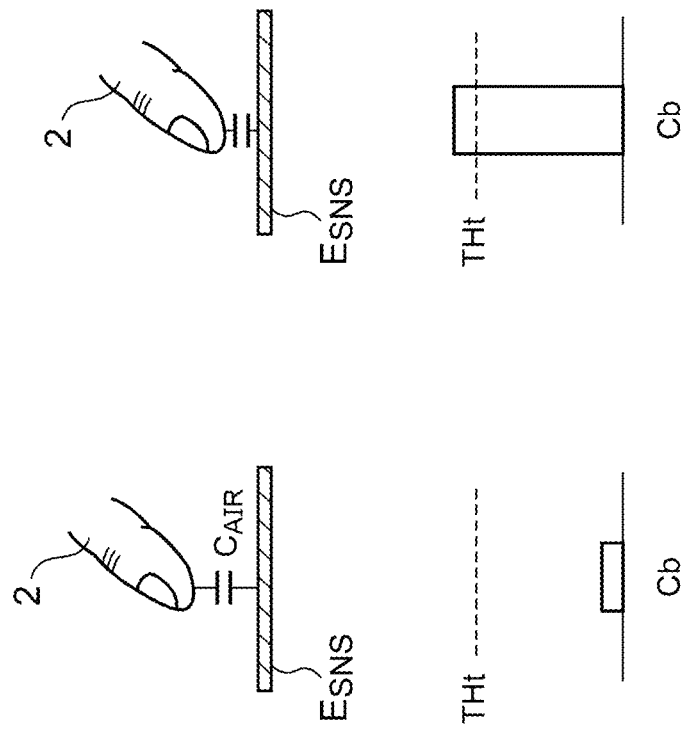

FIG. 6A
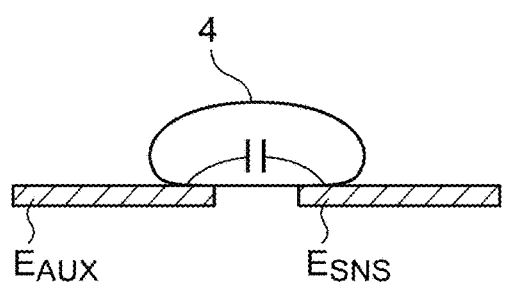
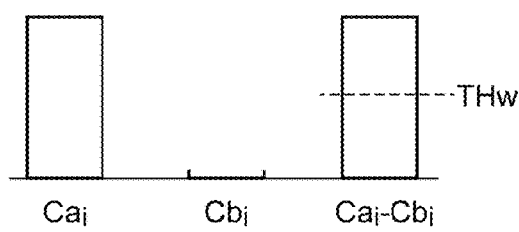
PAST FRAME
FIG. 6B
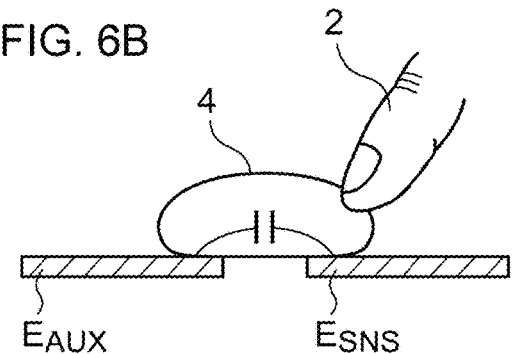
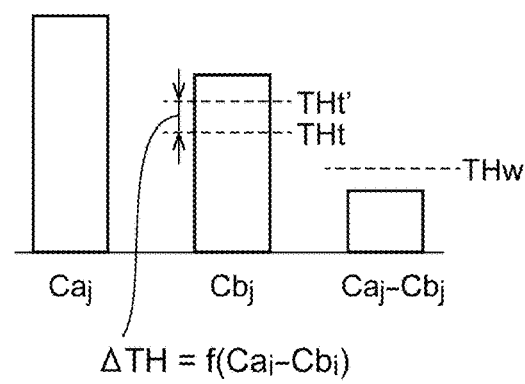
$\Delta TH = f(Ca_i - Cb_i)$
CURRENT FRAME

TOUCH DETECTION CIRCUIT WITH DETECTION OF WATER

CROSS REFERENCE TO RELATED APPLICATIONS

The present invention claims priority under 35 U.S.C. § 119 to Japanese Application No. 2019-107232 filed Jun. 7, 2019, the entire content of which is incorporated herein by reference.

BACKGROUND OF THE INVENTION

1. Field of the Invention

The present invention relates to an electrostatic capacitance detection circuit.

2. Description of the Related Art

A touch input device is mounted as a user interface on a recent electronic apparatus such as a computer, a smartphone, a tablet terminal, a portable audio device, or the like. A touch pad, a pointing device, and the like are known as such touch input devices, and various kinds of input can be performed by making a finger or a stylus contact or be located adjacent to such a touch input device.

The touch input devices are roughly classified into: a resistive film system; and an electrostatic capacitance system. The electrostatic capacitance system detects presence/absence of user input and coordinates thereof by converting, into an electric signal, a change in electrostatic capacitance (hereinafter also simply referred to as capacitance) in accordance with the user input, in which the electrostatic capacitance is formed by a plurality of sensor electrodes.

An electrostatic capacitance detection method roughly is classified into: a self-capacitance method; and a mutual-capacitance method. The self-capacitance method provides extremely high sensitivity and can detect not only a touch but also adjacency of a finger. However, the self-capacitance method has problems that: adhesion of a water droplet cannot be distinguished from a touch; and a two-point touch cannot be detected. On the other hand, the mutual-capacitance method has advantages of being capable of detecting the two-point touch (or a multi-touch more than the two-point touch) and is hardly affected by a water droplet, whereas the mutual-capacitance method is inferior to the self-capacitance method in terms of detection sensitivity. Therefore, the self-capacitance method and the mutual-capacitance method are selected in accordance with its use, or both methods are used in combination.

SUMMARY OF THE INVENTION

The present invention is made in view of above-described situations, and an example of a general purpose of an embodiment of the present invention is to provide a touch detection circuit capable of detecting water.

One embodiment of the present invention relates to a touch detection circuit. A touch detection circuit includes: a first terminal to which a first electrode is to be coupled; a second terminal to which a second electrode located adjacent to the first electrode is to be coupled; a capacitance sensing circuit structured to (i) sense first electrostatic capacitance formed by the first electrode in a space with a periphery including the second electrode, and (ii) sense, by a self-capacitance method, second electrostatic capacitance formed by the first electrode in a space with a periphery in a state where voltage of the second terminal is made to follow voltage of the first terminal; and a signal processor structured to detect, on the basis of a difference between the first electrostatic capacitance and the second electrostatic capacitance, water over the first electrode and the second electrode.

Note that any combination of the aforementioned constituent elements or any wording of the present invention substituted mutually between a method, a device, and so forth may also be effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A to 3D are diagrams each illustrating a relation between a panel state, first electrostatic capacitance, second electrostatic capacitance, and a difference therebetween;

FIGS. 4A and 4B are diagrams schematically illustrating touch detection in the absence of water, and FIGS. 4C and 4D are diagrams schematically illustrating touch detection in the presence of water;

FIGS. 6A and 6B are diagrams to describe correction processing utilizing a past frame;

DETAILED DESCRIPTION OF THE INVENTION

Figure 1:
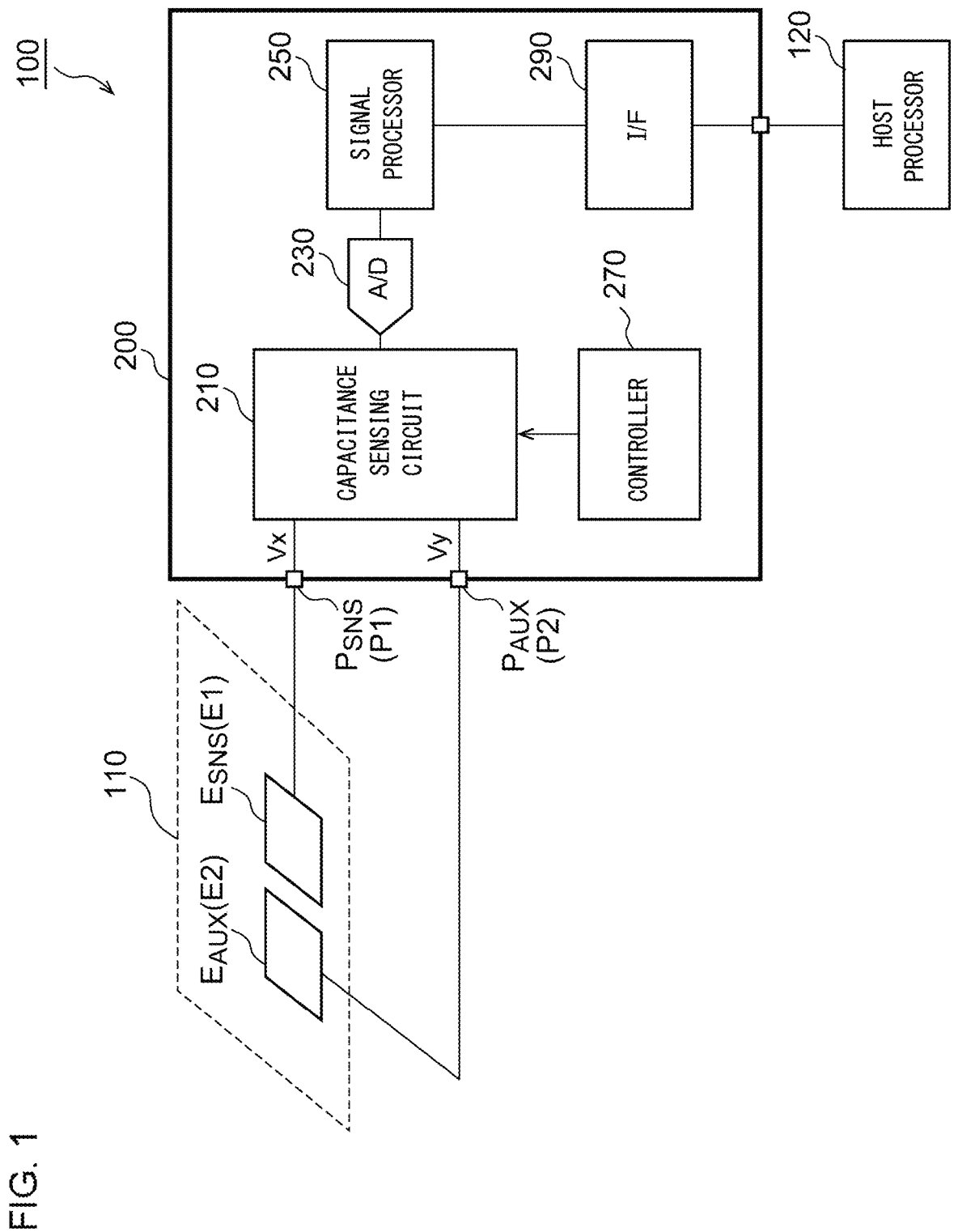
FIG. 1 is a block diagram of a touch input device including a touch detection circuit according to a first embodiment.

The invention will now be described based on preferred embodiments which do not intend to limit the scope of the present invention but exemplify the invention. All of the features and the combinations thereof described in the embodiment are not necessarily essential to the invention.

OUTLINE OF EMBODIMENT

One embodiment disclosed herein relates to a touch detection circuit. A touch detection circuit includes: a first terminal to which a first electrode is to be coupled; a second terminal to which a second electrode located adjacent to the first electrode is to be coupled; a capacitance sensing circuit structured to (i) sense first electrostatic capacitance formed by the first electrode in a space with a periphery including the second electrode, and (ii) sense, by a self-capacitance method, second electrostatic capacitance formed by the first electrode in a space with a periphery in a state where voltage of the second terminal is made to follow voltage of the first terminal; and a signal processor structured to detect, on the basis of a difference between the first electrostatic capacitance and the second electrostatic capacitance, water over the first electrode and the second electrode.

In a case where the water is present across the first electrode and the second electrode, electrostatic capacitance thereof is included in the first electrostatic capacitance but not included in the second electrostatic capacitance. Accordingly, presence/absence of the water can be determined by obtaining a difference between the first electrostatic capacitance and the second electrostatic capacitance.

The capacitance sensing circuit may sense the first electrostatic capacitance by the self-capacitance method. The capacitance sensing circuit may also sense the first electrostatic capacitance by a mutual-capacitance method.

The capacitance sensing circuit may further include a cancel circuit that drives the second terminal such that the voltage of the second electrode follows the voltage of the first electrode. The second electrostatic capacitance may be measured by the self-capacitance method in a state where the cancel circuit is enabled.

Depending on a configuration and a detection method of the capacitance sensing circuit, detection sensitivity for the first electrostatic capacitance may largely differ from detection sensitivity for the second electrostatic capacitance. In this case, the signal processor may correct an error between the sensitivity of the capacitance sensing circuit for the first electrostatic capacitance and the sensitivity of the capacitance sensing circuit for the second electrostatic capacitance.

The signal processor may determine, on the basis of the second electrostatic capacitance, presence/absence of a touch on the first electrode.

At the time of performing touch determination for a certain frame, the signal processor may generate a correction value on the basis of the second electrostatic capacitance measured in a past frame, correct at least one of second electrostatic capacitance of a current frame and a threshold value for touch detection by using the correction value, and determine presence/absence of a touch on the first electrode on the basis of a comparison result between the second electrostatic capacitance and the threshold value after the correction. Consequently, it is possible to cancel influence of electrostatic capacitance of the water over each of the electrodes.

A determination condition to determine presence/absence of a touch on the first electrode may be changed in accordance with a detection result of the water.

The determination condition to determine presence/absence of a touch on the first electrode for a certain frame may be changed in accordance with a detection result of the water in a frame prior to the certain frame.

The capacitance sensing circuit senses (iii) third electrostatic capacitance formed by the second electrode in a space with a periphery including the first electrode, and also (iv) senses, by the self-capacitance method, fourth electrostatic capacitance formed by the second electrode in a space with a periphery in a state where the voltage of the first terminal is made to follow the voltage of the second terminal, in addition to the first electrostatic capacitance and the second electrostatic capacitance. Consequently, touch input to the first electrode and touch input to the second electrode can be detected.

The touch detection circuit may further include a selector that is provided between the capacitance sensing circuit and a portion including the first terminal and the second terminal, and may switch a coupling relation of the capacitance sensing circuit between the first terminal and the second terminal.

EMBODIMENTS

Hereinafter, the present invention will be described with reference to the drawings on the basis of preferred embodiments. The same or equivalent constituent elements, members, and processing illustrated in the drawings will be denoted by the same reference signs, and repetition of the same description will be omitted as appropriate. Additionally, the embodiments are not intended to limit the invention but provided as the examples, and all of features and combinations thereof described in the embodiments are not necessarily essential to the invention.

In the present specification, "a state where a member A is coupled to a member B" includes not only a case where the member A is physically directly coupled to the member B but also a case where the member A and member B are indirectly coupled via another member that does not substantially affect an electric coupling state therebetween or does not impair functions and effects provided by coupling the members.

Similarly, "a state where a member C is provided between the member A and the member B" includes not only a case where the member A is directly coupled to the member C or the member B is directly coupled to the member C but also a case where the member A is indirectly coupled to the member C or the member B is indirectly coupled to the member C via another member that does not substantially affect an electric coupling state therebetween or does not impair functions and effects provided by coupling the members.

First Embodiment

FIG. 1 is a block diagram of a touch input device 100 including a touch detection circuit 200 according to a first embodiment. The touch input device 100 is a user interface that detects touch operation (hereinafter, including adjacency) of a finger 2 of a user (or a stylus).

The touch input device 100 includes a panel 110, a host processor 120, and a touch detection circuit 200. The panel 110 is a touch panel or a switch panel, and includes a first electrode E1 (hereinafter referred to as a sense electrode $E_{SNS}$) and a second electrode E2 (hereinafter referred to as an auxiliary electrode $E_{AUX}$). Preferably, the sense electrode $E_{SNS}$ and the auxiliary electrode $E_{AUX}$ are located adjacent to each other to an extent such that both of the electrodes contact a same water droplet or a same water accumulation when water adheres to a surface of the panel 110. In the present embodiment, only presence/absence of a touch on (including adjacency to) the sense electrode $E_{SNS}$ is determined, and a touch on the auxiliary electrode $E_{AUX}$ is not to be detected.

The host processor 120 is a host controller that integrally controls an apparatus, a device, and a system where the touch input device 100 is mounted. The touch detection circuit 200 can transmit, to the host processor 120, a state of the panel 110, more specifically, presence/absence of input (adjacency) to the panel 110 and presence/absence of water adhesion.

The touch detection circuit 200 includes a first terminal P1 (hereinafter referred to as a sense terminal $P_{SNS}$) and a second terminal P2 (hereinafter referred to as an auxiliary terminal $P_{AUX}$). The sense terminal $P_{SNS}$ is coupled to the sense electrode $E_{SNS}$ that is a touch sensing target, and the auxiliary terminal $P_{AUX}$ is coupled to the auxiliary electrode $E_{AUX}$.

The touch detection circuit 200 includes a capacitance sensing circuit 210, an A/D converter 230, a signal processor 250, a controller 270, and an interface circuit 290.

The capacitance sensing circuit 210 (i) senses first electrostatic capacitance Ca formed by the sense electrode $E_{SNS}$ in a space with a periphery including the auxiliary electrode $E_{AUX}$ and generates a first detection signal VCa indicating the first electrostatic capacitance Ca. Additionally, in a state where voltage Vy of the auxiliary terminal $P_{AUX}$ is made to follow voltage Vx of the sense terminal $P_{SNS}$, the capacitance sensing circuit 210 (ii) senses, by the self-capacitance method, second electrostatic capacitance Cb formed by the sense electrode $E_{SNS}$ in a space with a periphery, and generates a second detection signal VCb indicating the second electrostatic capacitance Cb. The sensing of the first electrostatic capacitance Ca and the sensing of the second electrostatic capacitance Cb are performed in a time-sharing manner.

The A/D converter 230 converts the first detection signal VCa and the second detection signal VCb into a first digital signal DCa and a second digital signal DCb, respectively. The signal processor 250 determines presence/absence of a touch on the sense electrode $E_{SNS}$ on the basis of at least one of the first digital signal DCa and the second digital signal DCb. For example, when the second electrostatic capacitance Cb exceeds a threshold value THt for touch detection, the signal processor 250 may determine that a touch is made.

Additionally, the signal processor 250 determines presence/absence of water adhesion to the panel 110 on the basis of a difference between the first digital signal DCa and the second digital signal DCb, that is, a difference between the first electrostatic capacitance Ca and the second electrostatic capacitance Cb. Specifically, when a differential capacitance ΔC between the first electrostatic capacitance Ca and the second electrostatic capacitance Cb exceeds a threshold value THw for water detection, the signal processor 250 may determine that the water adheres.

Note that, depending on a configuration and a detection method of the capacitance sensing circuit 210, detection sensitivity for the first electrostatic capacitance Ca may largely differ from detection sensitivity for the second electrostatic capacitance Cb. In this case, preferably, the signal processor 250 corrects at least one of the first digital signal DCa and the second digital signal DCb, and performs water detection and touch detection on the basis of the first digital signal DCa and the second digital signal DCb after the correction.

The interface circuit 290 is coupled to the host processor 120. Not limited thereto, the interface circuit 290 includes, for example, an inter-integrated circuit ($I^2C$) interface, a serial peripheral interface (SPI), or the like, and transmits a detection result of the signal processor 250 to the host processor 120.

Figure 2:
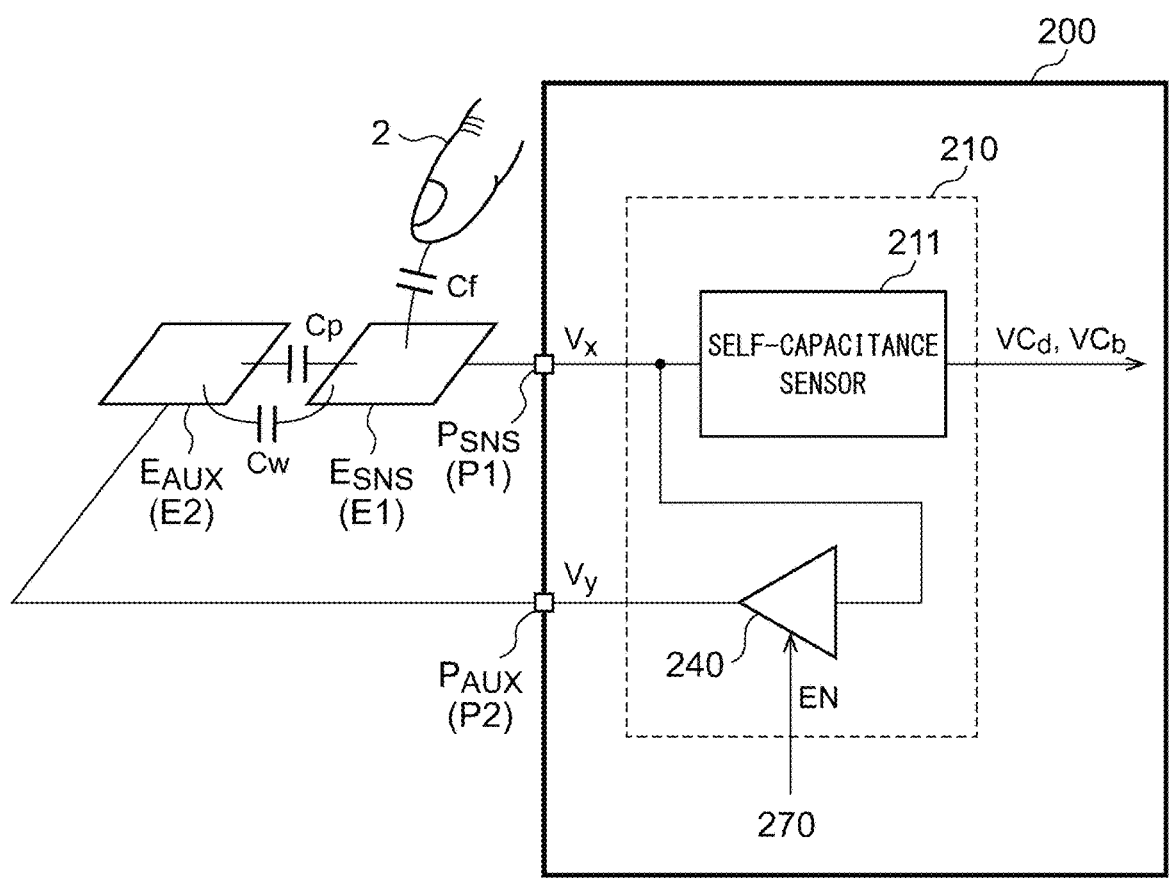
FIG. 2 is a diagram illustrating an exemplary configuration of a capacitance sensing circuit.

FIG. 2 is a diagram illustrating an exemplary configuration of the capacitance sensing circuit 210. The capacitance sensing circuit 210 includes a self-capacitance sensor 211 and a cancel circuit 240. The self-capacitance sensor 211 is coupled to the sense electrode $E_{SNS}$ via the sense terminal $P_{SNS}$ and detects, by the self-capacitance method, electrostatic capacitance Cs formed by the sense electrode $E_{SNS}$ in a space with a periphery thereof.

A circuit form of the self-capacitance sensor 211 is not particularly limited, and a known technology may be employed. During the sensing by the self-capacitance sensor 211, the sense terminal $P_{SNS}$ and the sense electrode $E_{SNS}$ have substantially the same potential, and the voltage Vx of the sense terminal $P_{SNS}$ fluctuates.

The cancel circuit 240 has an output coupled to the auxiliary electrode $E_{AUX}$ via the auxiliary terminal $P_{AUX}$. The cancel circuit 240 can be switched between an enable state and a disable state under the control of the controller 270. The cancel circuit 240 is switched to the disable state at the time of measuring the first electrostatic capacitance Ca, and switched to the enable state at the time of measuring the second electrostatic capacitance Cb.

The output of the cancel circuit 240 has high impedance in the disabled state. In this state, electrostatic capacitance Cs1 detected by the self-capacitance sensor 211 includes: electrostatic capacitance Cf between the sense electrode $E_{SNS}$ and the finger 2; and parasitic capacitance Cp between the sense electrode $E_{SNS}$ and the auxiliary electrode $E_{AUX}$. Additionally, as described later, in a case where water adheres across the sense electrode $E_{SNS}$ and the auxiliary electrode $E_{AUX}$, electrostatic capacitance Cw caused by the water is also included.

$Cs1=Cf+Cp+Cw$

This electrostatic capacitance Cs1 corresponds to the above-described first electrostatic capacitance Ca.

In the enable state, the cancel circuit 240 changes the voltage Vy of the auxiliary terminal $P_{AUX}$ while following the voltage Vx of the sense terminal $P_{SNS}$. Consequently, the voltage of the sense electrode $E_{SNS}$ and the voltage of the auxiliary electrode $E_{AUX}$ become equal while the sensing is performed by the self-capacitance sensor 211. Therefore, a parasitic capacitance Cp component and an electrostatic capacitance Cw component formed by the sense electrode $E_{SNS}$ in a space with the auxiliary electrode $E_{AUX}$ become invisible to the self-capacitance sensor 211, and electrostatic capacitance Cs2 detected by the self-capacitance sensor 211 includes only a component (for example, an electrostatic capacitance Cf component in the space with the finger) other than these components.

$Cs2=Cf$

This electrostatic capacitance Cs2 corresponds to the above-described second electrostatic capacitance Cb.

Thus, according to the capacitance sensing circuit 210 of FIG. 2, the first electrostatic capacitance Ca and the second electrostatic capacitance Cb can be measured.

Subsequently, operation of the touch input device 100 will be described. First, detection in an ideal state will be described. FIGS. 3A to 3D are diagrams each illustrating a relation between a panel state, the first electrostatic capacitance Ca, the second electrostatic capacitance Cb, and a differential capacitance $\Delta C$ therebetween (=Ca-Cb). A length of each bar represents a capacitance value, but a relative magnitude relation therebetween may be illustrated differently from actual one for easy understanding.

FIG. 3A illustrates a state of having neither water nor adjacency of the finger 2. The first electrostatic capacitance Ca includes the parasitic capacitance Cp between the electrodes $E_{SNS}$ and $E_{AUX}$, and the second electrostatic capacitance Cb is zero. The differential capacitance $\Delta C$ between the first electrostatic capacitance Ca and the second electrostatic capacitance Cb is the parasitic capacitance Cp. In this example, the differential capacitance $\Delta C$ is smaller than the threshold value THw for water detection, and therefore, it is determined that there is no water.

FIG. 3B illustrates a state where the finger 2 is located in an adjacent manner in the state of FIG. 3A. The first electrostatic capacitance Ca includes the parasitic capacitance Cp and the electrostatic capacitance Cf in a space with the finger, and the second electrostatic capacitance Cb includes the electrostatic capacitance in the space with the finger 2. The differential capacitance $\Delta C$ between the first electrostatic capacitance Ca and the second electrostatic capacitance Cb is the parasitic capacitance Cp. In this example also, since the differential capacitance $\Delta C$ is smaller than the threshold value THw for water detection, it can be determined that there is no water. Additionally, since the second electrostatic capacitance Cb exceeds the threshold value THt for touch detection, it can be determined that a touch is made.

FIG. 3C illustrates a case where water 4 adheres across the sense electrode $E_{SNS}$ and the auxiliary electrode $E_{AUX}$. The first electrostatic capacitance Ca includes: the parasitic capacitance Cp between the sense electrode $E_{SNS}$ and the auxiliary electrode $E_{AUX}$; and the electrostatic capacitance Cw of the water. The second electrostatic capacitance Cb is zero. The differential capacitance $\Delta C$ between the first electrostatic capacitance Ca and the second electrostatic capacitance Cb is the parasitic capacitance Cp+the electrostatic capacitance Cw. In this example, the differential capacitance $\Delta C$ exceeds the threshold value THw for water detection, and therefore, it can be determined that the water 4 is in an adhering state. Additionally, since the second electrostatic capacitance Cb is smaller than the threshold value THt for touch detection, it can be determined that no touch is made.

FIG. 3D illustrates a state where the finger 2 is located in an adjacent manner in the state of FIG. 3C. The first electrostatic capacitance Ca includes the parasitic capacitance Cp, the electrostatic capacitance Cw, and the electrostatic capacitance Cf. The second electrostatic capacitance Cb includes the electrostatic capacitance Cf. The differential capacitance $\Delta C$ includes the parasitic capacitance Cp and the electrostatic capacitance Cw of the water. In this example, the differential capacitance $\Delta C$ exceeds the threshold value THw for water detection, and therefore, it can be determined that the water 4 is in the adhering state. Additionally, since the second electrostatic capacitance Cb exceeds the threshold value THt for touch detection, it can be determined that a touch is made.

The above is basic operation of the touch input device 100. According to the touch input device 100, the presence/absence of adhesion of the water 4 can be determined, and also the presence/absence of a touch on the sense electrode $E_{SNS}$ can be determined.

Next, a modified example related to the touch determination will be described.

First Modified Example

There is a case where sensitivity of finger detection may be changed depending on presence/absence of the water. FIGS. 4A and 4B are diagrams schematically illustrating touch detection in the absence of water, and FIGS. 4C and 4D are diagrams schematically illustrating touch detection in the presence of the water.

As illustrated in FIGS. 4A and 4B, in a case where the finger approaches to the dry sense electrode $E_{SNS}$, a space between the finger and the sense electrode $E_{SNS}$ is air. Therefore, electrostatic capacitance $C_{AIR}$ of the space therebetween is extremely small. Therefore, the second electrostatic capacitance Cb does not exceed the threshold value THt for touch detection unless a distance between the finger 2 and the sense electrode $E_{SNS}$ becomes considerably close.

Now, refer to FIGS. 4C and 4D. The water 4 has relative permittivity larger than that of the air. Therefore, as illustrated in FIG. 4C, in a case where the water 4 adheres to the sense electrode $E_{SNS}$, when the finger 2 contacts the water 4, the second electrostatic capacitance Cb exceeds the threshold value THt for touch detection even though the finger 2 does not contact the sense electrode $E_{SNS}$, and it is determined that a touch is made. As illustrated in FIG. 4D, when the finger 2 contacts the sense electrode $E_{SNS}$, the second electrostatic capacitance Cb is further increased. Thus, in the case where the water adheres, the detection sensitivity for the finger may be excessively high, compared to the case where the water does not adhere.

The detection sensitivity at the time of the water adhering has a correlation with an amount of the water over the sense electrode $E_{SNS}$. Accordingly, in the first modified example, correction processing is performed in accordance with presence/absence of water adhesion, and a touch determination condition is changed. More preferably, in a case where it is determined that the water adheres (that is, in a case of $\Delta C > THw$), the electrostatic capacitance of the water which currently adheres is estimated, and the correction processing based on the estimated value $\hat{Cw}$ is performed. As already described above, the differential capacitance $\Delta C$ between the first electrostatic capacitance Ca and the second electrostatic capacitance Cb has the correlation with the amount of the water, in other words, the electrostatic capacitance Cw of the water. Accordingly, the electrostatic capacitance of the water may be estimated by multiplying the differential capacitance $\Delta C$ by a predetermined coefficient k.

$$\hat{Cw} = k \times (Ca-Cb)$$

Alternatively, the estimated value $\hat{Cw}$ of the electrostatic capacitance of the water may be calculated by using a more complicated arbitrary function f (Ca−Cb).

$$\hat{Cw} = f(Ca-Cb)$$

Alternatively, a relation between the differential capacitance $\Delta C$ and the estimated value $\hat{Cw}$ may be held in a table.

Some of the correction processing based on the estimated value of the electrostatic capacitance of the water will be described.

In first correction processing, the threshold value THt for touch detection is dynamically shifted on the basis of the estimated value $Cw\hat{}$. The shifted threshold value THt' is represented as follows.

$$THt'=THt+Cw\hat{}$$

The first correction processing is illustrated in FIGS. 4C and 4D. The threshold value at the time of the water adhesion is represented as THt'. In the case where the water adheres, the threshold value THt' is increased. Consequently, the case of FIG. 4C can be determined as a non-touched state and the case of FIG. 4D can be determined as a touched state. That is, the detection sensitivity can be made uniform between in the presence of the water and in the absence of the water.

In second correction processing, influence of the water 4 is reduced by subtracting the estimated value $Cw\hat{}$ from the second electrostatic capacitance Cb obtained by measurement, and corrected capacitance Cb' is compared with the fixed threshold value THt for touch detection.

$$Cb'=Cb-Cw\hat{}$$

Those skilled in the art understand that the first correction processing and the second correction processing are equivalent. That is, at least one of the electrostatic capacitance Cb and the threshold value THt is corrected on the basis of the estimated value $Cw\hat{}$ of the electrostatic capacitance of the water, and the touch determination is performed on the basis of a comparison result between the electrostatic capacitance Cb and the threshold value THt after the correction.

Second Modified Example

Figure 5A:
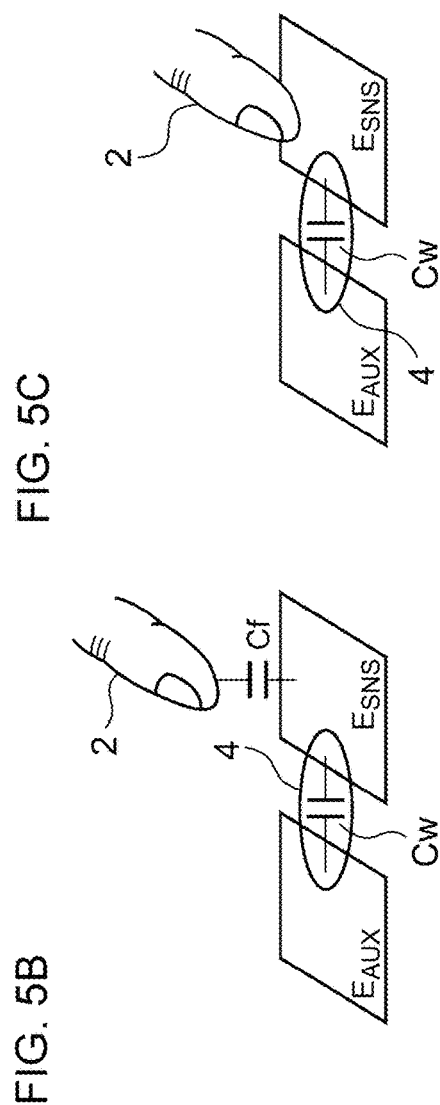
FIGS. 5A to 5C are diagrams to describe transition when a finger approaches to and touches a panel to which the water adheres.

As described above, the touch input device 100 according to the present embodiment can determine presence/absence of the water. However, such water detection is accurate when the finger 2 is in the non-touched state, but when the finger 2 is moved adjacent to the panel 110 (the sense electrode $E_{SNS}$) to a certain extent, the water can be hardly detected. Transition when the finger is moved adjacent from a distance will be described with reference to FIGS. 5A to 5C. FIG. 5A is a diagram illustrating a state where the finger 2 is located extremely distant, FIG. 5B is a diagram illustrating a state where the finger approaches, and FIG. 5C is a diagram illustrating a touched state of the finger.

FIG. 5A illustrates the state where the water 4 adheres to the panel, and corresponds to FIG. 3C. At this time, the water can be detected on the basis of the differential capacitance ΔC.

Figure 5B:
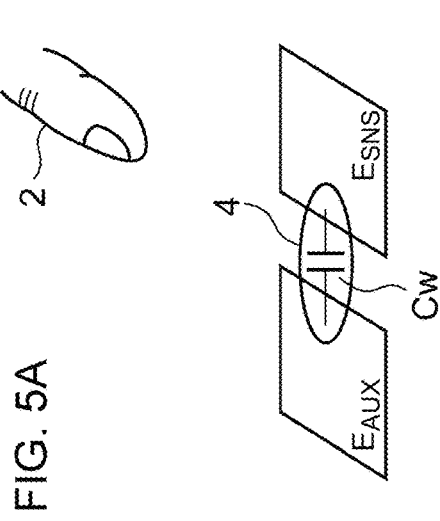

FIG. 5B illustrates a process in which the finger 2 approaches to the panel to which the water 4 adheres. In this state, detection sensitivity may be different between at the time of measuring the first electrostatic capacitance Ca and at the time of measuring the second electrostatic capacitance Cb. In this example, a measurement value of the electrostatic capacitance Cf component of the finger 2 is relatively large at the time of measuring the second electrostatic capacitance Cb, but the measurement value is relatively small at the time of measuring the first electrostatic capacitance Ca. As a result, the differential capacitance Ca–Cb becomes lower than the threshold value THw for water detection, and the water 4 cannot be detected. Since the second electrostatic capacitance Cb is lower than threshold value THt for water detection, no touch is detected.

Figure 5C:
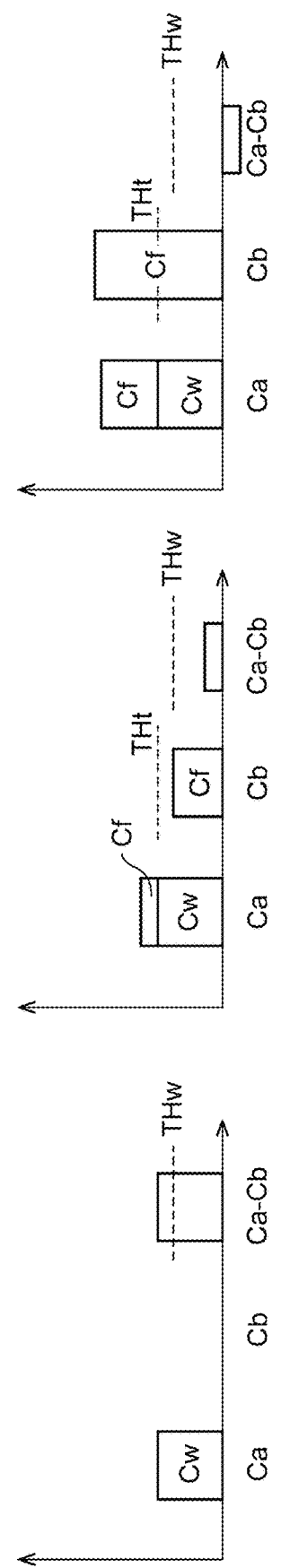

FIG. 5C illustrates the state where the finger 2 is in contact with the sense electrode $E_{SNS}$. In this state also, a measurement value of the electrostatic capacitance Cf component of the finger 2 is small at the time of measuring the first electrostatic capacitance Ca, and the measurement value of the electrostatic capacitance Cf component of the finger 2 is large at the time of measuring the second electrostatic capacitance Cb. Therefore, the differential capacitance Ca–Cb becomes lower than the threshold value THw for water detection, and the water 4 cannot be detected. Since the second electrostatic capacitance Cb is larger than threshold value THt for touch detection, a touch can be detected.

Thus, the presence of the water 4 can be detected in the state of FIG. 5A, but when the finger 2 approaches to the panel, the touch input device 100 misses this presence of the water. As described in the first and second modified examples, in a case of reflecting presence/absence of the water to a determination criterion for touch detection (the threshold value THt' for touch detection), touch detection accuracy is degraded when the presence/absence of the water is erroneously determined.

In the second modified example, the above-described problem is prevented as follows. Water adhesion and finger approach seldom occur at the same time, and in many cases, the water first adheres to the panel, and then the finger approaches to the panel and finally contacts the same. That is, direct transition from the state of FIG. 3C to the state of FIG. 5B is practically impossible, and normally, the state of FIG. 3C transitions to the state of FIG. 5B via the state of FIG. 5A. This principle is preferably incorporated in algorithms of the water detection and the touch detection in the signal processor 250.

Assume that the touch input device 100 detects the first electrostatic capacitance Ca and the second electrostatic capacitance Cb at a predetermined frame rate. At this time, it is preferable to determine, for a certain frame, the determination condition to determine presence/absence of a touch (for example, the threshold value THt for touch detection) is determined in accordance with a determination result on presence/absence of the water and an amount of the water obtained in a frame prior to the certain frame (for example, several frames before).

The water is accurately detected in the certain frame in the state of FIG. 5A, and the states of FIGS. 5B and 5C are determined in subsequent frames thereto. In the frames where the states of FIGS. 5B and 5C are sensed, the detected state in the past frame at the time of sensing the state of FIG. 5A is referenced. Therefore, the processing is executed while assuming that the water 4 is present.

FIGS. 6A and 6B are diagrams to describe correction processing utilizing a past frame. The first electrostatic capacitance Ca and the second electrostatic capacitance Cb obtained in an $i^{th}$ (i=1, 2 . . . ) frame are represented as $Ca_i$ and $Cb_i$.

FIG. 6A illustrates the $i^{th}$ frame in the past, and since $Ca_i - Cb_i > THw$ is satisfied, the water 4 is detected. A value of a differential capacitance $\Delta C_i = Ca_i - Cb_i$ at this time or an estimated value $Cw\hat{}_i$ of the electrostatic capacitance of the water obtained from the value are retained for several frames without being discarded.

FIG. 6B illustrates a $j^{th}$ frame located a few frames after FIG. 6A. A difference in the differential capacitance $\Delta C_j$ is smaller than the threshold value THw for water detection due to the approach of the finger 2, but the detection result of the $i^{th}$ frame in the past is referenced and the processing is performed assuming that the water 4 is present. Therefore, there is no differential capacitance $\Delta C_j$ (or no estimated value Cw^$_j$) of the current frame, and calculation is performed on the basis of the retained differential capacitance $\Delta C_i$ (or the estimated value Cw^$_i$) of the past frame.

Thus, by referring to the detection result of the past frame, the presence/absence of the touch of the finger 2 can be correctly determined in consideration of the amount of the water 4.

Subsequently, implementation examples of the capacitance sensing circuit 210 will be described.

Figure 7:
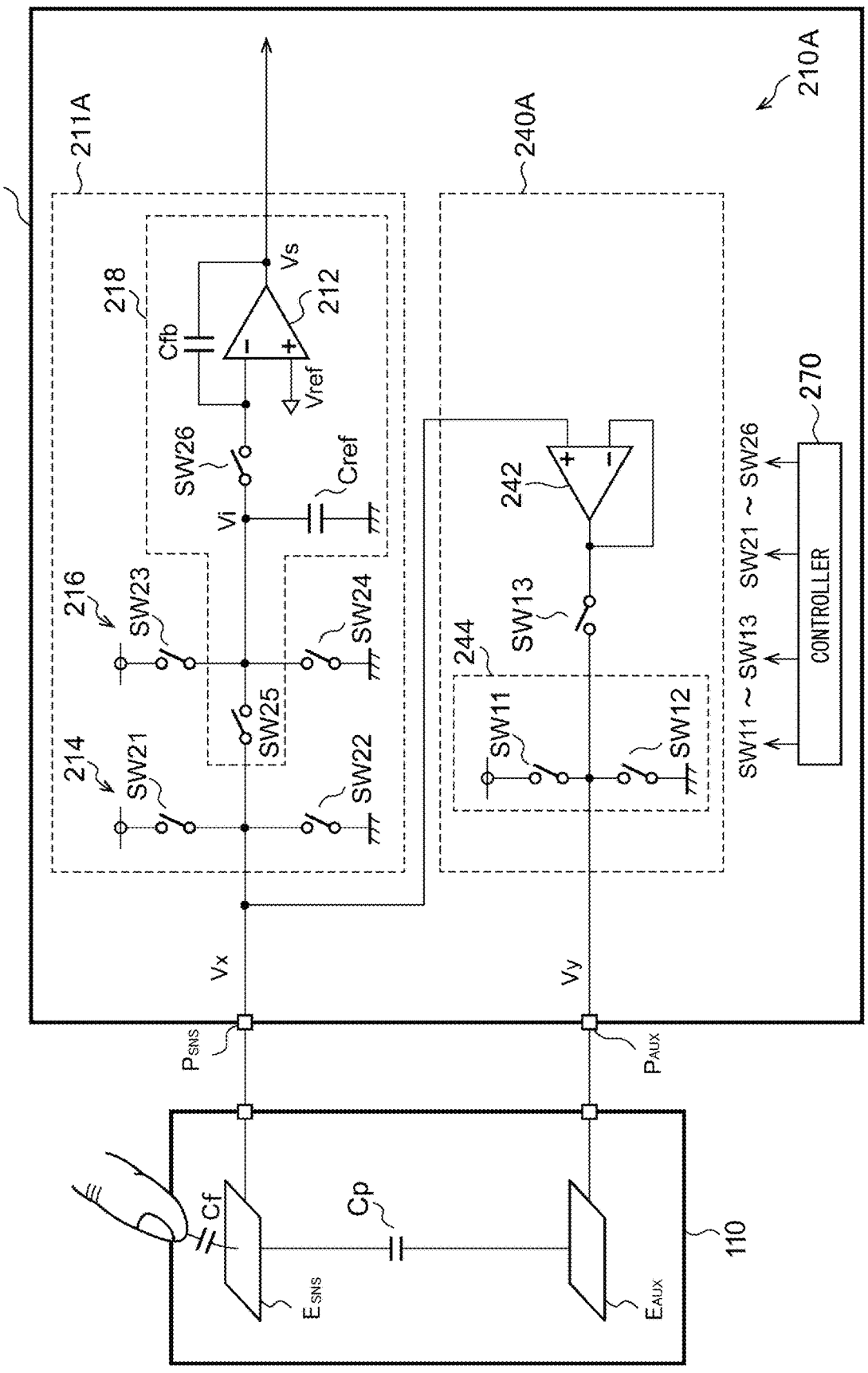
FIG. 7 is a circuit diagram illustrating a first implementation example of the capacitance sensing circuit.

FIG. 7 is a circuit diagram illustrating a first implementation example (210A) of the capacitance sensing circuit 210. The capacitance sensing circuit 210A includes a capacitance sensor 211A and a cancel circuit 240A. The capacitance sensor 211A includes a plurality of switches SW21 to SW26, an operational amplifier 212, a reference capacitor Cref, and a feedback capacitor Cfb. The reference capacitor Cref has one end grounded. The reference capacitor Cref has the other end coupled to the sense terminal P$_{SNS}$ via the charge transfer switch SW25, and is coupled to an inverting input terminal (−) of the operational amplifier 212 via the amplification switch SW26.

The charge transfer switch SW25, the amplification switch SW26, the reference capacitor Cref, the feedback capacitor Cfb, and the operational amplifier 212 form an integrator 218 using a switched capacitor. Reference voltage Vref is applied to a non-inverting input terminal (+) of the operational amplifier 212, and the feedback capacitor Cfb is provided between an output of the operational amplifier 212 and the inverting input terminal (−).

A pair of the upper switch SW21 and the lower switch SW22 forms a first driver 214, and changes the voltage Vx of the sense terminal P$_{SNS}$ in a range between two values of power supply voltage Vdd and ground voltage 0 V.

A pair of the upper switch SW23 and the lower switch SW24 forms a second driver 216, and changes voltage Vi of the reference capacitor Cref in a range between the two values of the power supply voltage Vdd and the ground voltage 0 V.

The switches SW21 to SW26 are controlled by the controller 270. The controller 270 may be a part of the signal processor 250. It is preferable to satisfy Vref=Vdd/2. An initialization switch (not illustrated) may also be provided in parallel to the feedback capacitor Cfb.

During a drive period (i), the capacitance sensor 211A applies one of the power supply voltage Vdd and the ground voltage 0 V to the sense terminal P$_{SNS}$ and applies the other one of the power supply voltage Vdd and the ground voltage 0 V to the reference capacitor Cref in a state where the charge transfer switch SW25 is turned off and the sense terminal P$_{SNS}$ is disconnected from the reference capacitor Cref.

During a subsequent sensing period, the capacitance sensor 211A has only the charge transfer switch SW25 turned on, and the sense terminal P$_{SNS}$ is coupled to the reference capacitor Cref. As a result, electric charge is transferred between the electrostatic capacitance Cs and the reference capacitor Cref. Assuming that the power supply voltage Vdd is applied to the sense terminal P$_{SNS}$ and the ground voltage 0 V is applied to the reference capacitor Cref during the drive period immediately before, following Expressions are established from the principle of electric charge conservation.

$$Cs \times Vdd = Vi \times (Cs + Cref) \quad (1)$$

$$Vi = Vdd \times Cs / (Cs + Cref) \quad (2)$$

Vi represents voltage of the reference capacitor Cref after completion of the electric charge transfer. Provided that Cs=Cref, Vi=Vdd/2 is satisfied.

During a subsequent amplification period, the amplification switch SW26 is turned on. As a result, the feedback capacitor Cfb is charged such that the voltage of the inverting input terminal (−) of the operational amplifier 212 becomes the reference voltage Vref, and it is possible to obtain detection voltage Vs as follows.

$$Vs = Vref - Cref/Cfb \times (Vi - Vref) \quad (3)$$

It is possible to find, from the Expressions (2) and (3), that the detection voltage Vs depends on the electrostatic capacitance Cs.

The drive auxiliary circuit 244 of the cancel circuit 240A includes a first switch SW11 and a second switch SW12. The first switch SW11 is provided between the auxiliary terminal P$_{AUX}$ and a power supply line, and the second switch SW12 is provided between the auxiliary terminal P$_{AUX}$ and a ground line. The first switch SW11 is turned on in conjunction with the upper switch SW21 of the first driver 214, and pulls up the voltage Vy of the auxiliary terminal P$_{AUX}$ to the power supply voltage Vdd. Furthermore, the second switch SW12 is turned on in conjunction with the lower switch SW22 of the first driver 214, and pulls down the voltage Vy of the auxiliary terminal P$_{AUX}$ to the ground voltage 0 V.

In the cancel circuit 240A, the switches SW11 to SW13 are each fixed to an off state in the disabled state.

Figure 8:
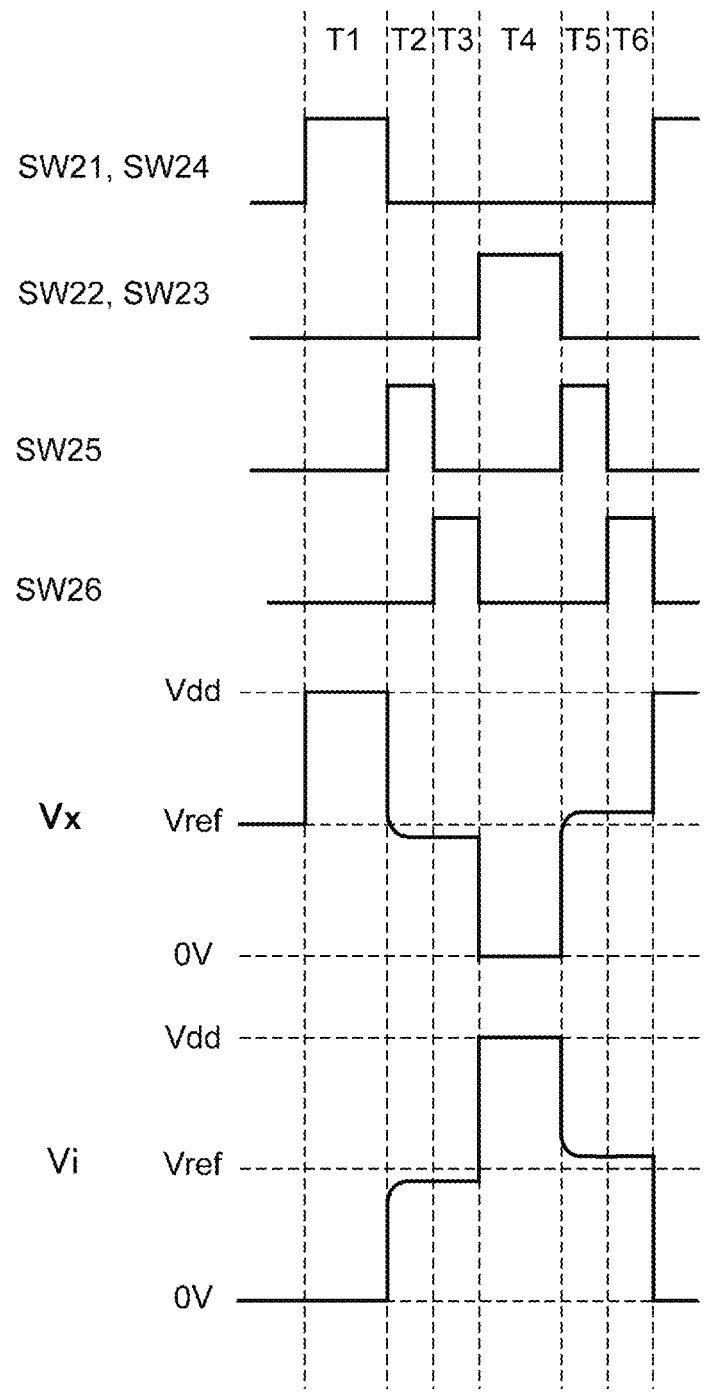
FIG. 8 is an operating waveform diagram of a capacitance sensor in FIG. 7.

FIG. 8 is an operating waveform diagram of the capacitance sensor 211A in FIG. 7. During a drive period T1, the upper switch SW21 and the lower switch SW24 are turned on, the power supply voltage Vdd is applied to the sense terminal P$_{SNS}$, and the ground voltage 0 V is applied to the reference capacitor Cref. During a subsequent transfer period T2, the charge transfer switch SW25 is turned on, and electric charge of the electrostatic capacitance Cs and electric charge of the reference capacitor Cref are averaged. The voltage Vi of the reference capacitor Cref is represented by a following Expression.

$$Vi = Vdd \times Cs / (Cs + Cref)$$

During a subsequent amplification period T3, the charge transfer switch SW25 is turned off, and the voltage Vi is held. When the amplification switch SW26 is turned on, the detection voltage Vs is generated.

During a subsequent drive period T4, the lower switch SW22 and the upper switch SW23 are turned on, the ground voltage 0 V is applied to the sense terminal P$_{SNS}$, and the power supply voltage Vdd is applied to the reference capacitor Cref. During a subsequent transfer period T5, the charge transfer switch SW25 is turned on, and the electric charge of the electrostatic capacitance Cs and the electric charge of the reference capacitor Cref are averaged.

$$Vi = Vdd \times Cref / (Cs + Cref)$$

During a subsequent amplification period T6, the charge transfer switch SW25 is turned off and the voltage Vi is held. When the amplification switch SW26 is turned on, the detection voltage Vs is generated.

Figure 9:
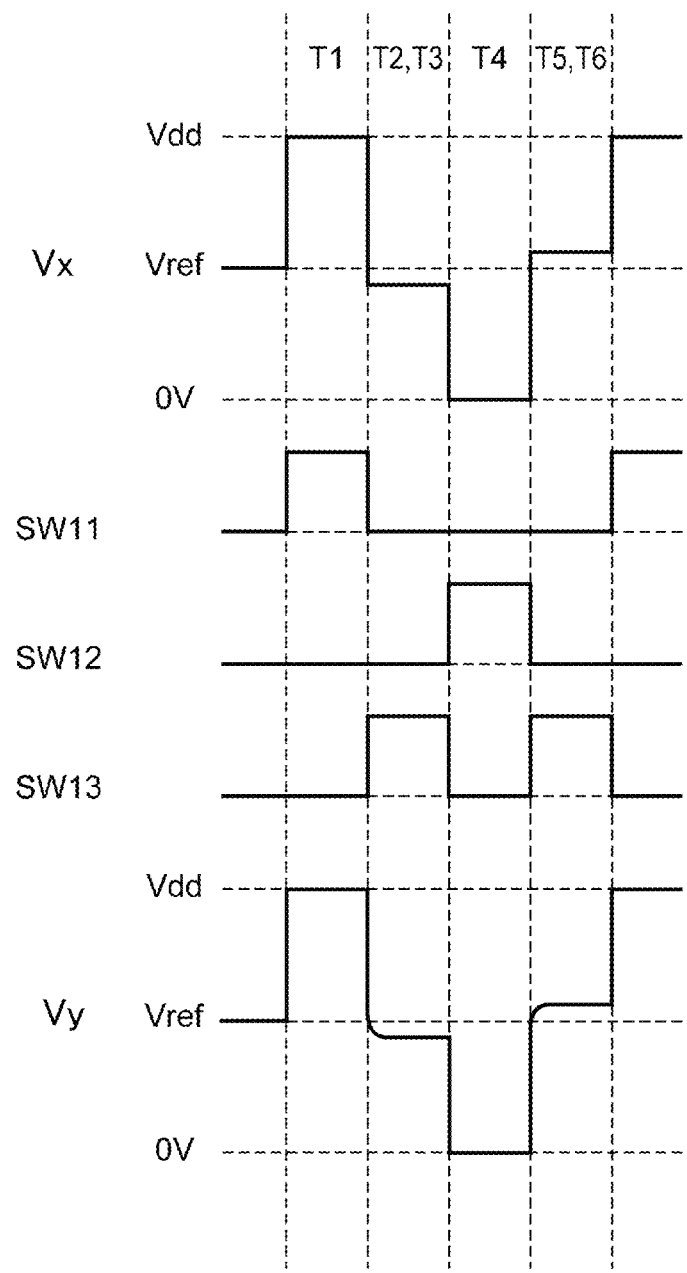
FIG. 9 is a diagram to describe sensing of second electrostatic capacitance by the capacitance sensing circuit.

FIG. 9 is a diagram to describe sensing of the second electrostatic capacitance Cb by the capacitance sensing circuit 210A. During the drive period T1, the voltage Vx of the sense terminal P$_{SNS}$ rises to the power supply voltage Vdd. Simultaneously, the voltage Vy of the auxiliary terminal P$_{AUX}$ rises to the power supply voltage Vdd while following the voltage Vx by turning on the first switch SW11.

During the transfer period T2 and the amplification period T3, the third switch SW13 is turned on, and the auxiliary terminal $P_{AUX}$ is coupled to an output of a buffer 242. As a result, the voltage Vy of the auxiliary terminal $P_{AUX}$ is made equal to the voltage Vx of the sense terminal $P_{SNS}$ by the buffer 242.

During the drive period T4, the voltage Vx of the sense terminal $P_{SNS}$ drops to the ground voltage 0 V. Simultaneously, the voltage Vy of the auxiliary terminal $P_{AUX}$ drops to the ground voltage 0 V while following the voltage Vx by turning on the second switch SW12.

During the transfer period T5 and the amplification period T6, the third switch SW13 is turned on, and the auxiliary terminal $P_{AUX}$ is coupled to the output of the buffer 242. As a result, the voltage Vy of the auxiliary terminal $P_{AUX}$ is made equal to the voltage Vx of the sense terminal $P_{SNS}$ by the buffer 242.

The above is the operation of the capacitance sensing circuit 210A. According to this capacitance sensing circuit 210A, the voltage Vy of the auxiliary terminal $P_{AUX}$ can be made to follow the voltage Vx of the sense terminal $P_{SNS}$ with a high speed, influence of the parasitic capacitance Cp and the electrostatic capacitance Cw between the sense electrode $E_{SNS}$ and the auxiliary electrode $E_{AUX}$ can be canceled, and the second electrostatic capacitance Cb can be measured.

In start timing of the drive period T1, the voltage Vy can be rapidly raised by the drive auxiliary circuit 244 instead of by the buffer 242. Additionally, in start timing of the drive period T4, the voltage Vy can be rapidly made to drop by the drive auxiliary circuit 244 instead of by the buffer 242.

Figure 10:
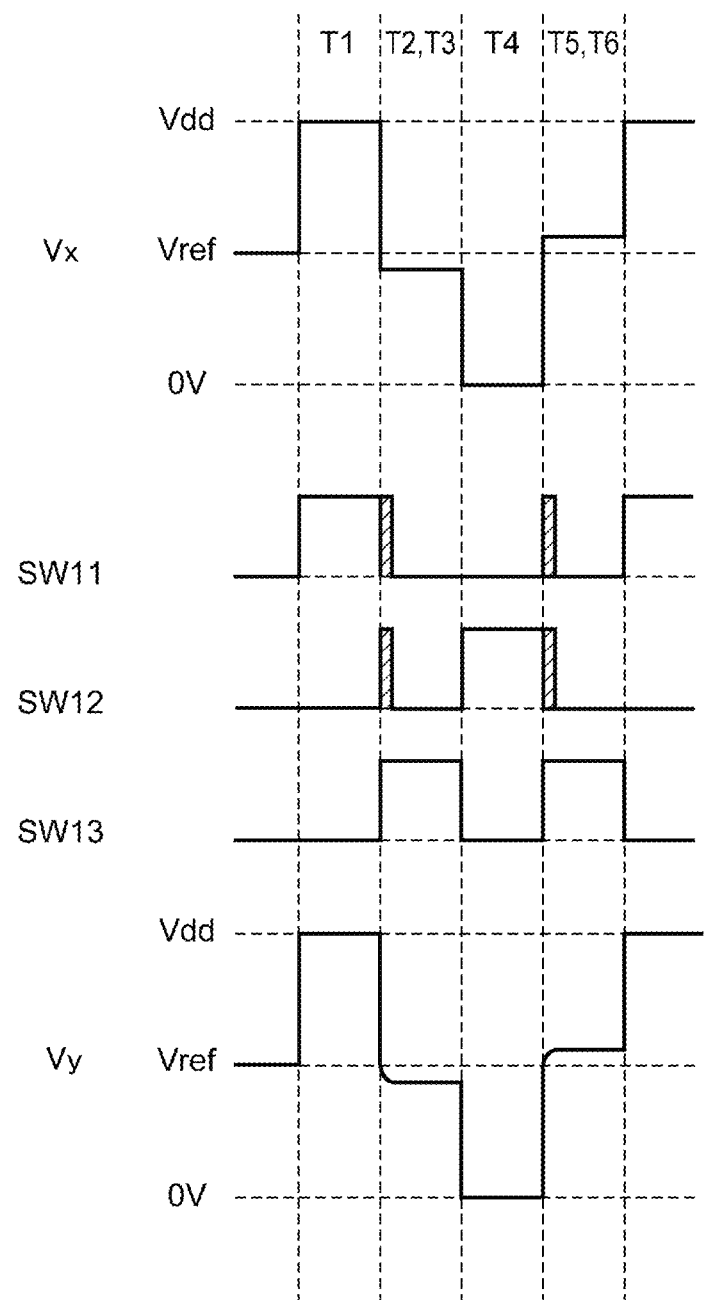
FIG. 10 is a diagram to describe a modified example of an operation sequence of the capacitance sensing circuit.

FIG. 10 is a diagram illustrating a modified example of an operation sequence of the capacitance sensing circuit 210A. In this modified example, a simultaneous ON period of the first switch SW11 and the second switch SW12 is provided immediately after transition from the drive period T1 to the transfer period T2. When ON resistance is equal between the first switch SW11 and the second switch SW12, the voltage Vy of the auxiliary terminal $P_{AUX}$ instantly drops to middle-point voltage between the power supply voltage Vdd and 0 V (that is, the reference voltage Vref) by the drive auxiliary circuit 244. Then, when both the first switch SW11 and the second switch SW12 are turned off, the voltage Vy of the auxiliary terminal $P_{AUX}$ is made equal to the voltage Vx of the sense terminal $P_{SNS}$ by the buffer 242.

Similarly, a simultaneous ON period for the first switch SW11 and the second switch SW12 is also provided immediately after transition from the drive period T4 to the transfer period T5. Consequently, the voltage Vy of the auxiliary terminal $P_{AUX}$ instantly rises to the middle-point voltage between the power supply voltage Vdd and 0 V (that is, the reference voltage Vref) by the drive auxiliary circuit 244. Then, when both the first switch SW11 and the second switch SW12 are turned off, the voltage Vy of the auxiliary terminal $P_{AUX}$ is made equal to the voltage Vx of the sense terminal $P_{SNS}$ by the buffer 242.

According to this modified example, the voltage Vy can be rapidly made to drop at end timing of the drive period T1 by the drive auxiliary circuit 244 instead of by the buffer 242. Additionally, the voltage Vy can be rapidly made to rise also at end timing of the drive period T4 by the drive auxiliary circuit 244 instead of by the buffer 242. Consequently, drive capacity required in the buffer 242 can be further reduced, and the circuit area and power consumption can be reduced.

Figure 11:
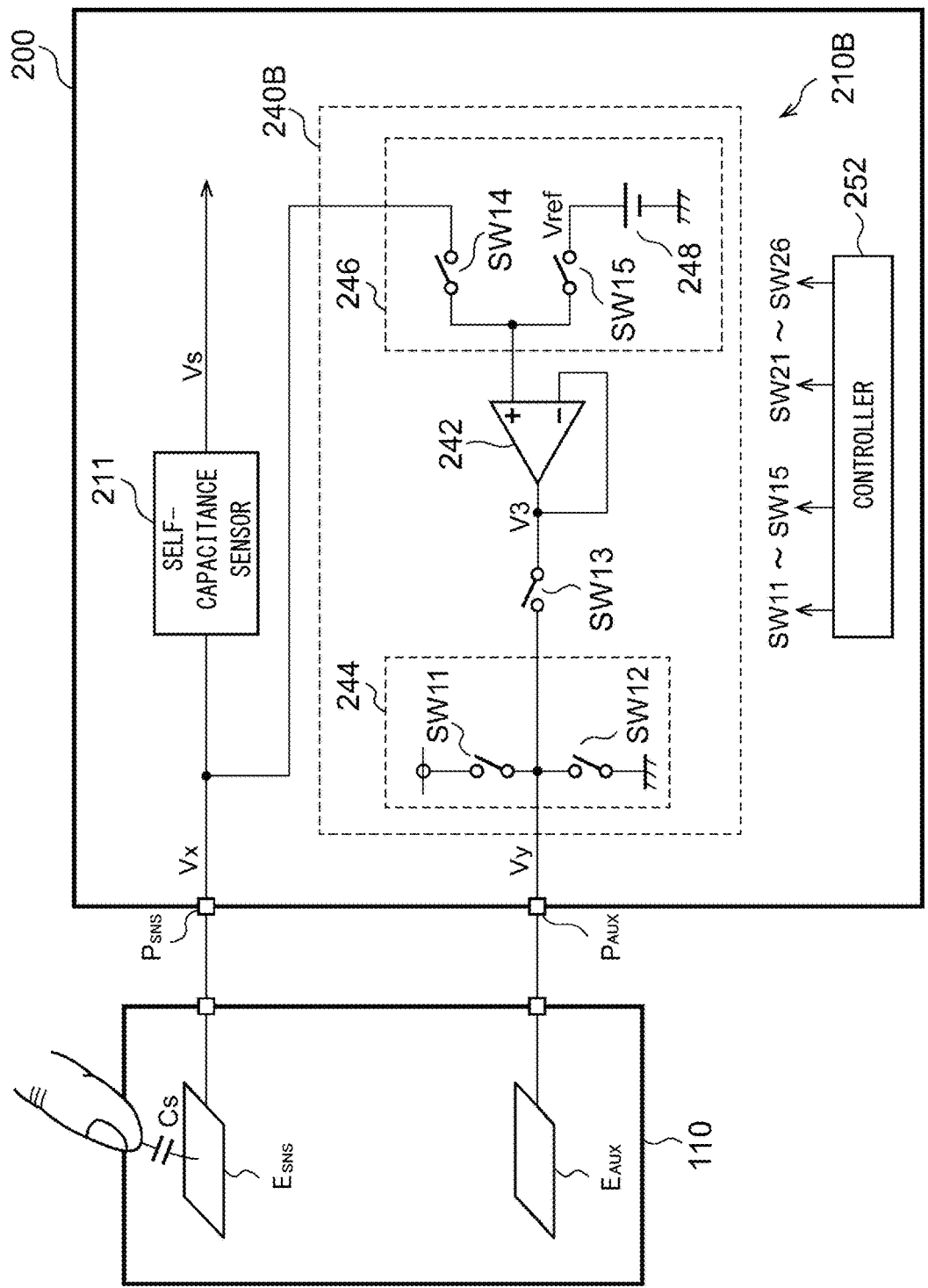
FIG. 11 is a circuit diagram illustrating a second implementation example of the capacitance sensing circuit.

FIG. 11 is a circuit diagram illustrating a second implementation example (210B) of the capacitance sensing circuit 210. A cancel circuit 240B includes a bias circuit 246 in addition to the cancel circuit 240A of FIG. 7. The bias circuit 246 supplies bias voltage Vbias to an input of the buffer 242 when the drive auxiliary circuit 244 is in the off state (an inactive state, that is, both SW11 and SW12 are turned off). The bias voltage Vbias is preferably made equal to or close to the reference voltage Vref.

The bias circuit 246 includes a fourth switch SW14, a fifth switch SW15, and a voltage source 248. For example, when Vbias=Vdd/2, the voltage source 248 may include a resistance voltage dividing circuit that divides the power supply voltage Vdd at a voltage division ratio of ½. The fourth switch SW14 is provided between the input of the buffer 242 and the sense terminal $P_{SNS}$. The fifth switch SW15 is provided between the input of the buffer 242 and the voltage source 248.

Figure 12:
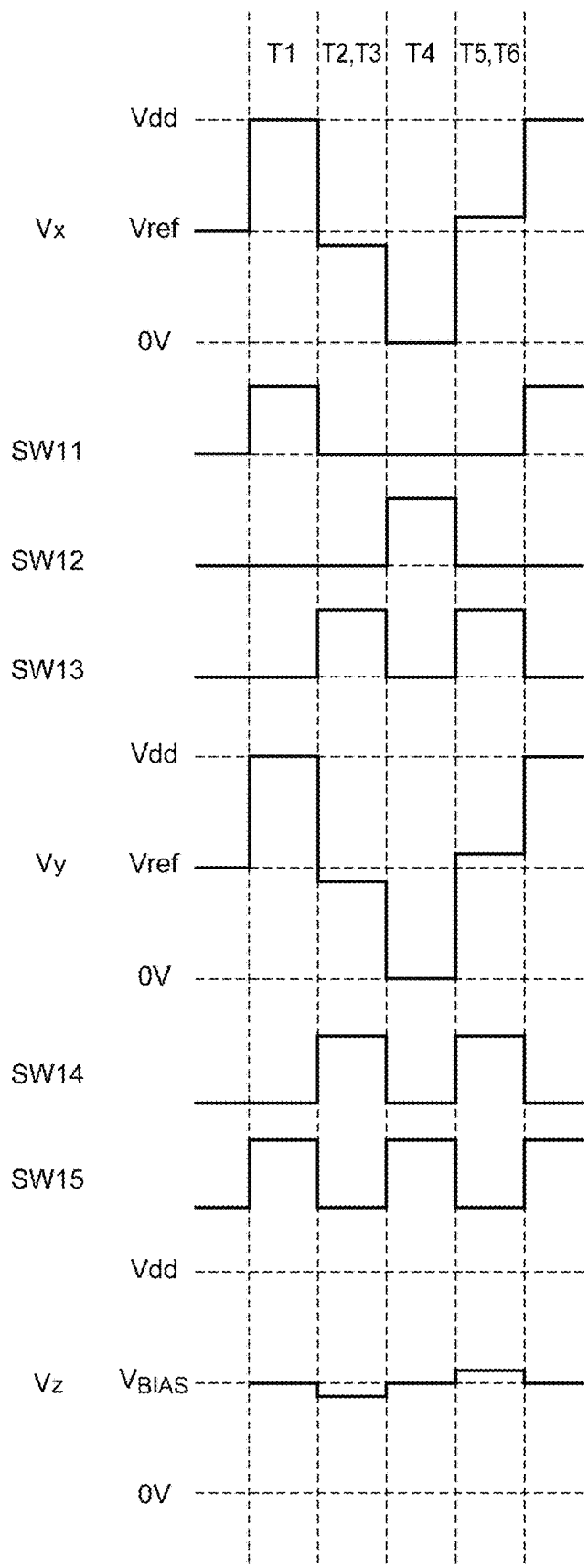
FIG. 12 is an operating waveform diagram of the capacitance sensing circuit of FIG. 11.

FIG. 12 is an operating waveform diagram of the capacitance sensing circuit 210B of FIG. 11. FIG. 12 illustrates output voltage Vz of the buffer 242. During the drive periods T1 and T4, the fourth switch SW14 is turned off, and the fifth switch SW15 is turned on. As a result, the output voltage Vz of the buffer 242 is kept at the bias voltage Vbias. During the transfer periods T2 and T5 and during the amplification periods T3 and T6, the fourth switch SW14 is turned on and the fifth switch SW15 is turned off, and the output voltage Vz of the buffer 242 becomes equal to the voltage Vx.

Thus, according to the second implementation example, a fluctuation range of the output voltage Vz of the buffer 242 can be narrowed. Consequently, the drive capacity of the buffer 242 can be reduced, and the circuit area and power consumption can be further reduced.

Figure 13:
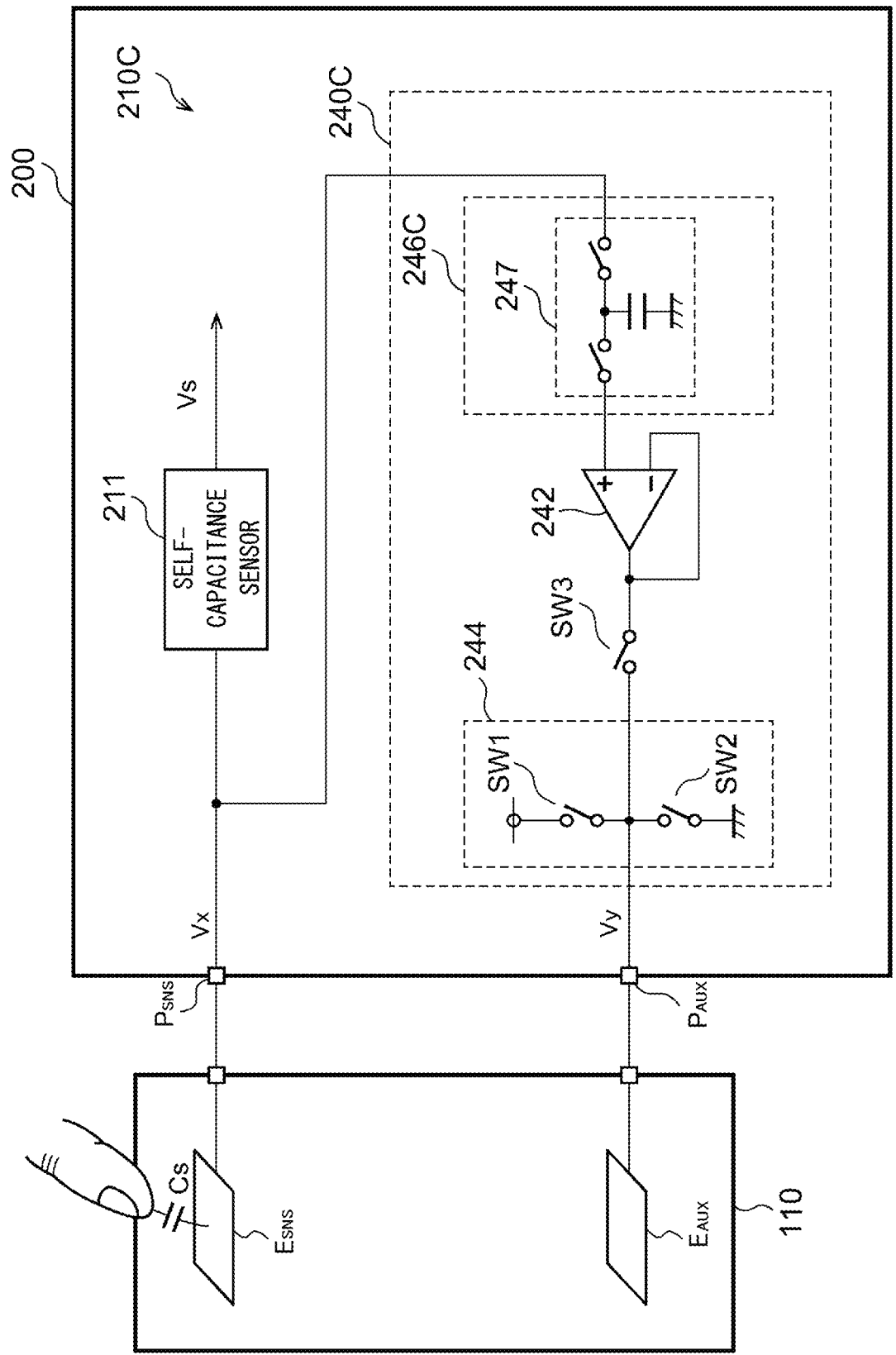
FIG. 13 is a circuit diagram of a third implementation example of the capacitance sensing circuit.

FIG. 13 is a circuit diagram of a third implementation example (210C) of the capacitance sensing circuit 210. A bias circuit 246C of a cancel circuit 240C includes a sample hold circuit 247. The sample hold circuit 247 samples and holds the voltage Vx of the sense terminal $P_{SNS}$ during the transfer period T2 (T5) and the amplification period T3 (T6). The bias circuit 246C outputs, as the bias voltage Vbias, the held voltage during the drive periods T1 and T4, and outputs the voltage Vx of the sense terminal $P_{SNS}$ during the transfer period T2 (T5) and the amplification period T3 (T6).

Figure 14:
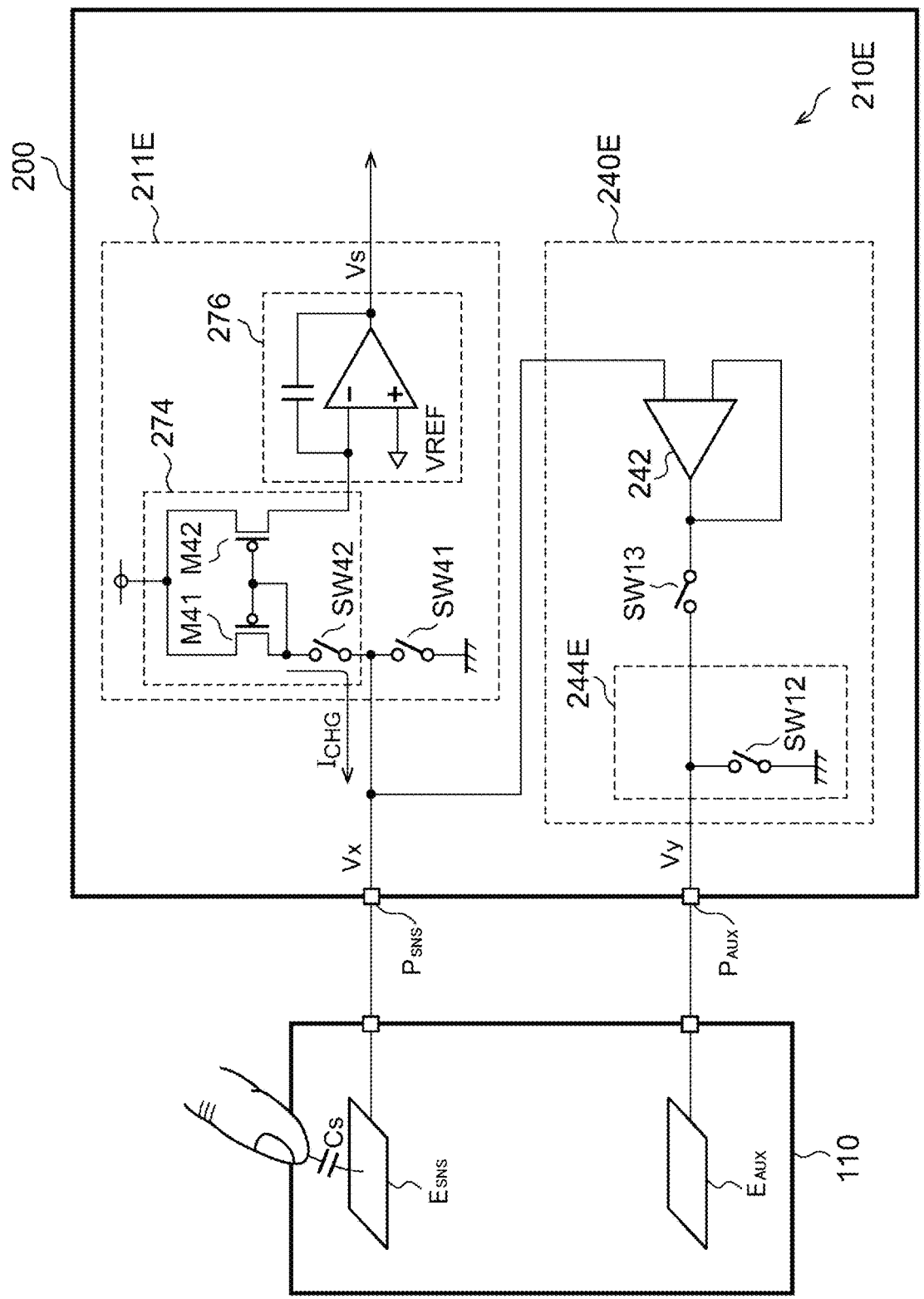
FIG. 14 is a circuit diagram of a fourth implementation example of the capacitance sensing circuit.

FIG. 14 is a circuit diagram of a fourth implementation example (210E) of the capacitance sensing circuit 210. A circuit form of the capacitance sensor 211E differs from that of the capacitance sensor 211A in FIG. 7. The capacitance sensor 211E includes a reset switch SW41, a current mirror circuit 274, and an integrator 276.

The reset switch SW41 is provided between the sense terminal $P_{SNS}$ and a ground line. The current mirror circuit 274 has an input-side transistor M41 coupled to the sense terminal $P_{SNS}$. The current mirror circuit 274 may include a sense switch SW42. The integrator 276 outputs detection voltage Vs obtained by integrating electric current Is flowing in an output-side transistor M42 of the current mirror circuit 274.

Figure 15:
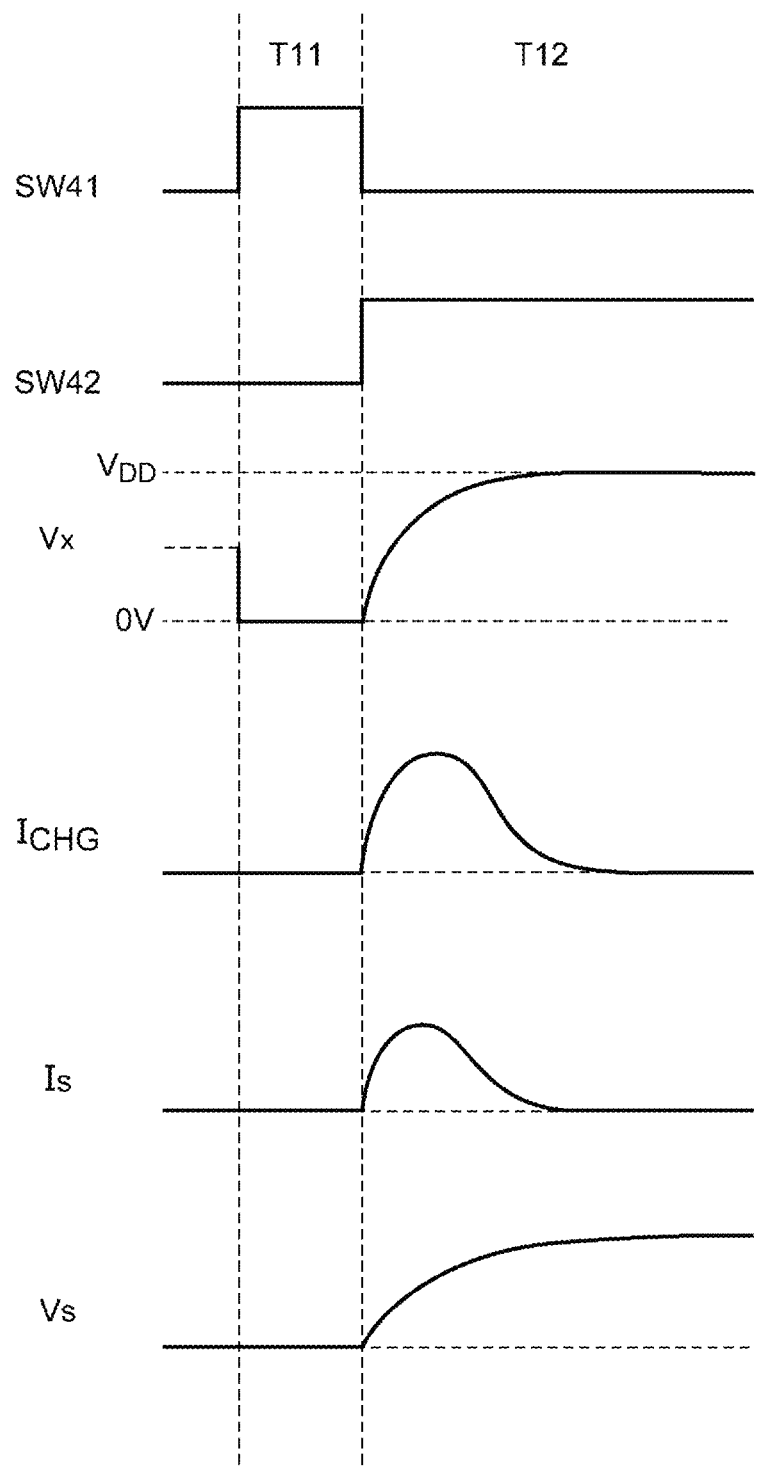
FIG. 15 is an operating waveform diagram of the capacitance sensor in FIG. 14.

FIG. 15 is an operating waveform diagram of the capacitance sensor 211E of FIG. 14. During a reset period T11, the reset switch SW41 is turned on, 0 V is applied to the sense terminal $P_{SNS}$, and the electrostatic capacitance Cs is discharged. Subsequently, when the sense switch SW42 is turned on during a sense period T12, charging current $I_{CHG}$ starts flowing in the input-side transistor of the current mirror circuit 274, and the electrostatic capacitance Cs is charged by the charging current $I_{CHG}$. Then, when the voltage Vx rises close to the power supply voltage Vdd, the input-side transistor M41 of the current mirror circuit 274 cuts off the charging current, and the charging is stopped. A change width ΔV of the voltage Vx is substantially equal to that of the power supply voltage Vdd, and total electric charge Q flowing into the electrostatic capacitance Cs at this time is: Q=Cs×ΔV=Cs×Vdd.

The charging current $I_{CHG}$ is copied by the current mirror circuit 274, and the copied current Is is integrated by the integrator 276. A voltage change proportional to an amount of the total electric charge Q, in other words, proportional to the electrostatic capacitance Cs is generated in the detection voltage Vs.

Refer to FIG. 14 again. The cancel circuit 240E changes the voltage Vy of the auxiliary terminal $P_{AUX}$ while following the voltage Vx illustrated in FIG. 15. When the reset switch SW41 is turned on, the voltage Vx is rapidly changed. Preferably, such a rapid change is caused by the drive auxiliary circuit 244E, and a gentle change of the voltage Vx after turning on the sense switch SW42 is caused by the buffer 242. In this case, the drive auxiliary circuit 244E can include the second switch SW12 provided between the auxiliary terminal $P_{AUX}$ and the ground.

Figure 16:
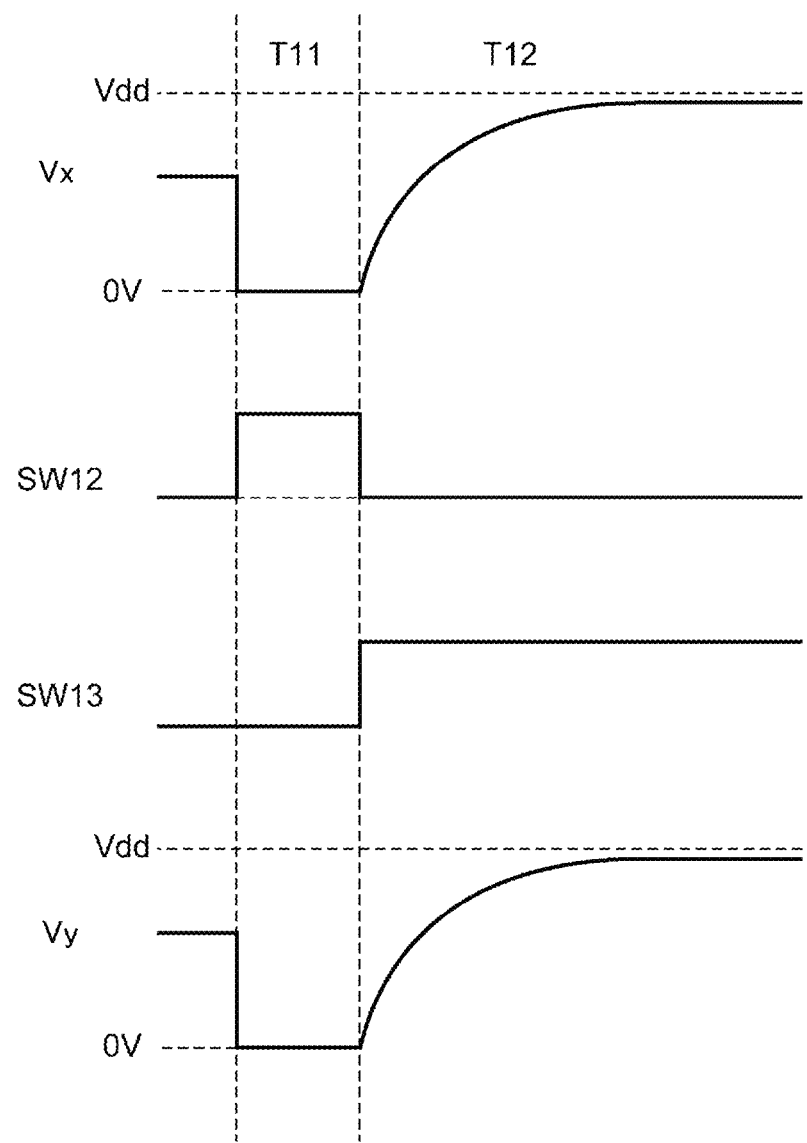
FIG. 16 is an operating waveform diagram of the capacitance sensing circuit of FIG. 14.

FIG. 16 is an operating waveform diagram of the capacitance sensing circuit 210E of FIG. 14. During the reset period T11, the reset switch SW41 is turned on, and the voltage Vy of the auxiliary terminal $P_{AUX}$ is pulled down to 0 V. Shifting to the sense period T12, the third switch SW13 is turned on, and voltage Vy of the auxiliary terminal $P_{AUX}$ is driven by the buffer 242 so as to be equal to the voltage Vx.

In the capacitance sensing circuit 210E of FIG. 14, the bias circuit 246 can be added to the input side of the buffer 242.

Second Embodiment

Figure 17:
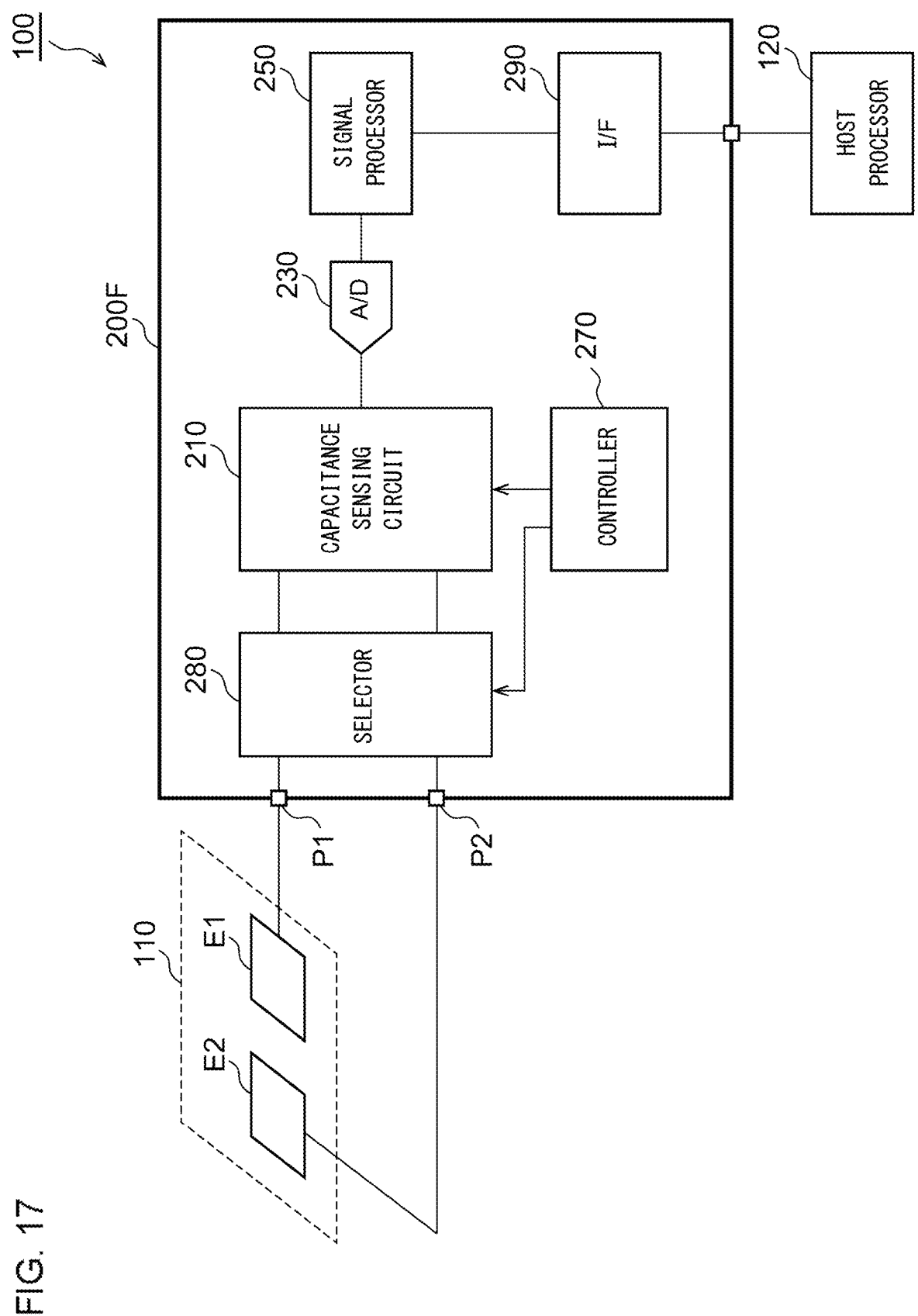
FIG. 17 is a block diagram of a touch input device including a touch detection circuit according to a second embodiment.

FIG. 17 is a block diagram of a touch input device 100 including a touch detection circuit 200F according to a second embodiment. A panel 110 includes a first electrode E1 and a second electrode E2. The touch detection circuit 200F includes: a first terminal P1 coupled to the first electrode E1; and a second terminal P2 coupled to the second electrode E2.

The touch detection circuit 200F further includes a selector 280 in addition to a touch detection circuit 200 of FIG. 1. The selector 280 is provided between a capacitance sensing circuit 210 and a portion including the first terminal P1 and the second terminal P2. The selector 280 can switch a coupling relation of the capacitance sensing circuit 210 between the first terminal P1 and the second terminal P2. That is, the capacitance sensing circuit 210 can perform switching between: a measurement mode in which touch input to the first electrode E1 is to be detected; and a measurement mode in which touch input to the second electrode E2 is to be detected.

The above is the configuration of the touch detection circuit 200F. Subsequently, operation thereof will be described. First, the capacitance sensing circuit 210 measures first electrostatic capacitance $Ca_1$ and second electrostatic capacitance $Cb_1$ while using the first electrode E1 as a sense electrode $E_{SNS}$ and the second electrode E2 as an auxiliary electrode $E_{AUX}$. Then, presence/absence of water and presence/absence of a touch are determined on the basis of the first electrostatic capacitance $Ca_1$ and the second electrostatic capacitance $Cb_1$. A method relating to touch determination and correction may be similar to those of a first embodiment.

Similarly, the capacitance sensing circuit 210 measures third electrostatic capacitance $Ca_2$ and fourth electrostatic capacitance $Cb_2$ while using the second electrode E2 as the sense electrode $E_{SNS}$ and the first electrode E1 as the auxiliary electrode $E_{AUX}$. The third electrostatic capacitance $Ca_2$ is electrostatic capacitance formed by the second electrode E2 in a space with a periphery including the first electrode E1. The fourth electrostatic capacitance $Cb_2$ is electrostatic capacitance formed by the second electrode E2 using a self-capacitance method in a space with a periphery thereof in a state where voltage of the first terminal P1 is made to follow voltage of the second terminal P2, and also the fourth electrostatic capacitance $Cb_2$ is electrostatic capacitance excluding electrostatic capacitance in a space with the first electrode E1.

Figure 18A:
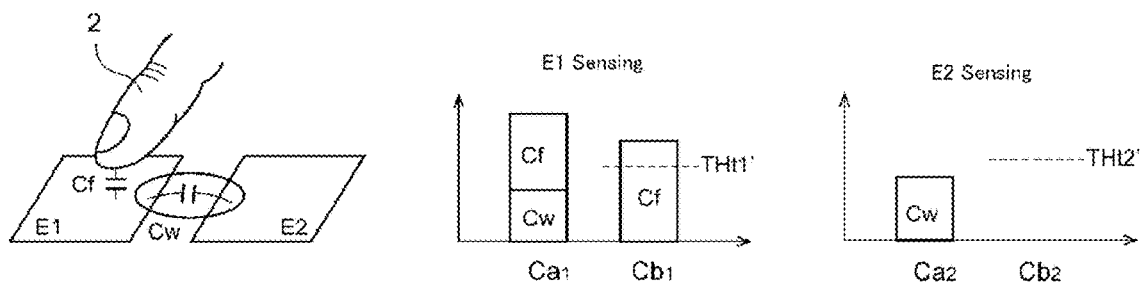
FIGS. 18A to 18C are diagrams to describe exemplary sensing by the touch detection circuit of FIG. 17.
Figure 18B:
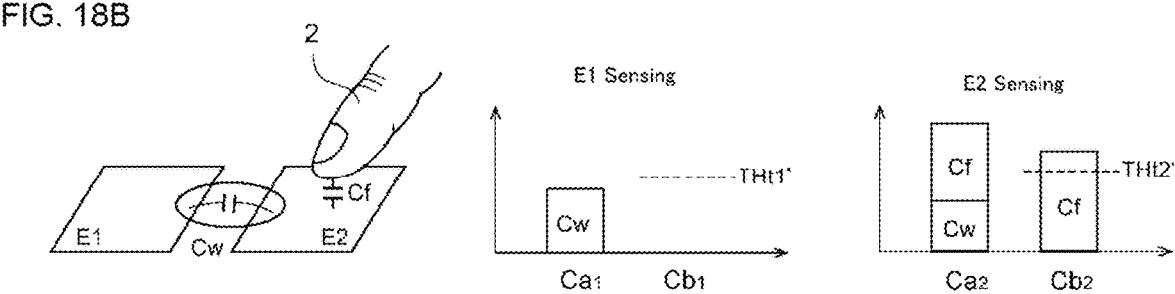
Figure 18C:
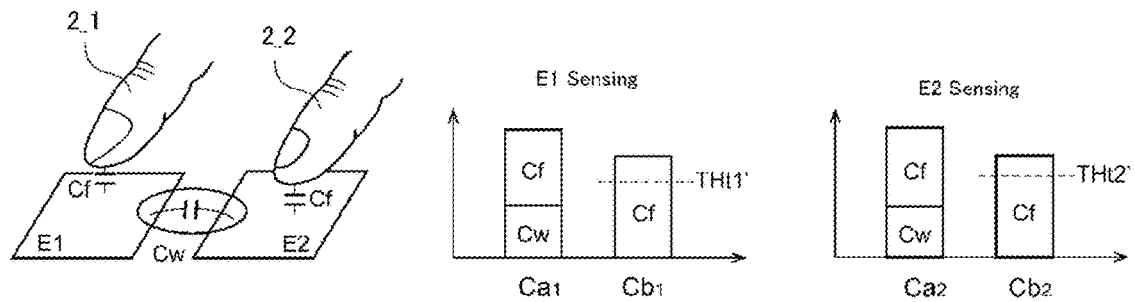

FIGS. 18A to 18C are diagrams to describe exemplary sensing by the touch detection circuit 200F of FIG. 17. Here, a first correction method is adopted as correction considering electrostatic capacitance of water.

FIG. 18A illustrates a state where the first electrode E1 is touched. First, the first electrostatic capacitance $Ca_1$ and the second electrostatic capacitance $Cb_1$ are measured while using the first electrode E1 as the sense electrode $E_{SNS}$. Since the second electrostatic capacitance $Cb_1$ exceeds a threshold value $THt_1'$ for touch detection, the touch on the first electrode E1 can be detected.

Subsequently, the third electrostatic capacitance $Ca_2$ and the fourth electrostatic capacitance $Cb_2$ are measured while using the second electrode E2 as the sense electrode $E_{SNS}$. Since the second electrostatic capacitance $Cb_2$ is substantially zero and smaller than a threshold value $THt_2'$ for touch detection, a touch on the second electrode E2 is not detected.

FIG. 18B illustrates a state where the second electrode E2 is touched. First, the first electrostatic capacitance $Ca_1$ and the second electrostatic capacitance $Cb_1$ are measured while using the first electrode E1 as the sense electrode $E_{SNS}$. Since the second electrostatic capacitance $Cb_1$ is substantially zero and smaller than the threshold value $THt_1'$ for touch detection, a touch on the first electrode E1 is not detected.

Subsequently, the third electrostatic capacitance $Ca_2$ and the fourth electrostatic capacitance $Cb_2$ are measured while using the second electrode E2 as the sense electrode $E_{SNS}$. Since the fourth electrostatic capacitance $Cb_2$ exceeds the threshold value $THt_2'$ for touch detection, a touch on the second electrode E2 is detected.

FIG. 18C illustrates a state where the first electrode E1 and the second electrode E2 are simultaneously touched (also referred to as multi-touch) with the two fingers 2_1 and 2_2. In this case, both the second electrostatic capacitance $Cb_1$ and the fourth electrostatic capacitance $Cb_2$ exceed the threshold value THt' for touch detection. Therefore, the multi-touch can be detected.

Thus, according to the touch input device 100 of FIG. 17, touch input to the first electrode E1 and touch input to the second electrode E2 can be individually detected. Note that threshold values $THt_1'$ and $THt_2'$ are illustrated to be equal in this example, but in a case where an amount of adhering water is different, the first electrode E1 and the second electrode E2 may have different threshold values $THt_1'$ and $THt_2'$ for touch detection.

Figure 19A:
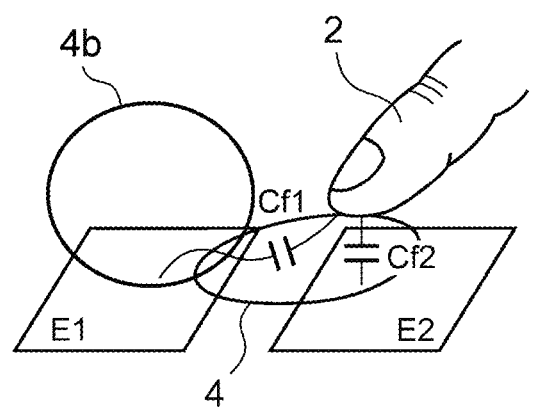
FIGS. 19A and 19B are diagrams to describe erroneous detection of a multi-touch.
Figure 19B:
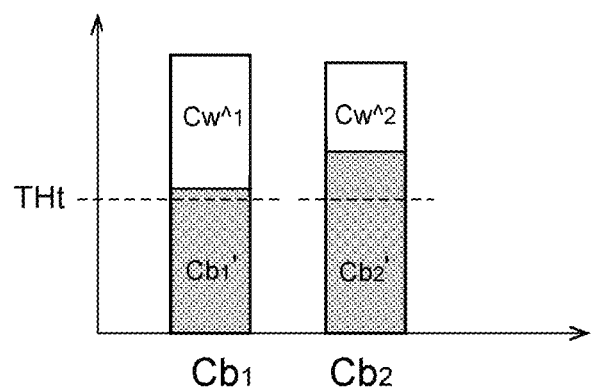

Note that, in the touch input device 100 of FIG. 17, a single touch may be erroneously determined as a multi-touch, depending on the amount of the water over each of the electrodes. FIGS. 19A and 19B are diagrams to describe such erroneous detection of the multi-touch. FIG. 19A illustrates an example in which the water adheres to the electrodes E1 and E2, and a large amount of water 4 adheres to the first electrode E1 side. Additionally, a finger 2 touches the second electrode E2 side.

FIG. 19B illustrates a combination of the electrostatic capacitance $Cb_1$ and the electrostatic capacitance $Cb_2$ which may be measured in the situation like FIG. 19A. Here, second correction processing is adopted as correction based on an estimated value $\hat{Cw}$ of electrostatic capacitance of the water. That is, as for the first electrode E1 side, an estimated value $\hat{Cw}_1$ of the water is subtracted from the second electrostatic capacitance $Cb_1$, and the corrected second electrostatic capacitance $Cb_1'$ is compared with a fixed threshold value THt for touch detection. Similarly, as for the second electrode E2 side, an estimated value $\hat{Cw}_2$ of the water is subtracted from the fourth electrostatic capacitance $Cb_2$, and corrected fourth electrostatic capacitance $Cb_2'$ is compared with the fixed threshold value THt for touch detection.

$$Cb_1' = Cb_1 - \hat{Cw}_1$$

$$Cb_2' = Cb_2 - \hat{Cw}_2$$

Figure 20:
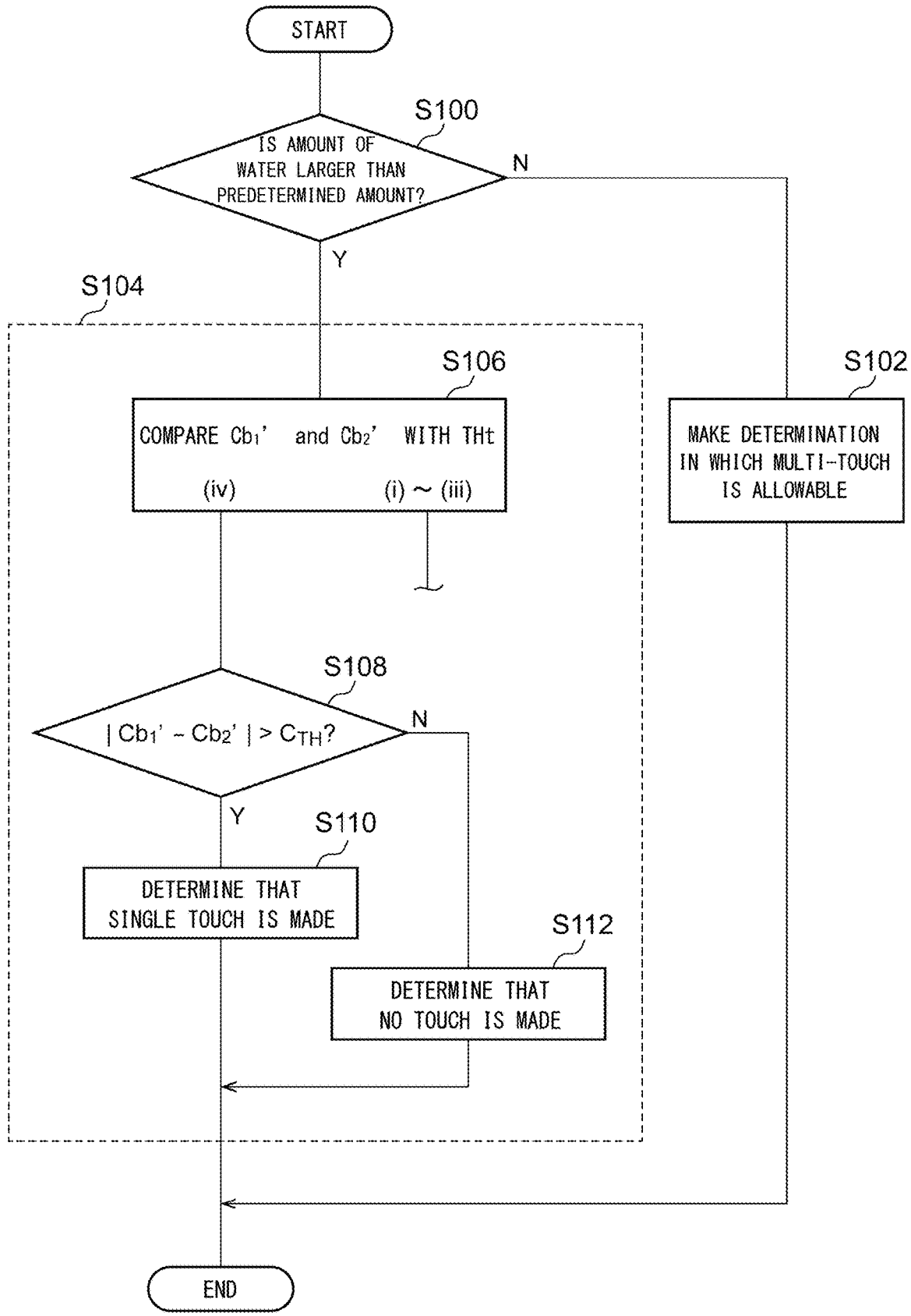
FIG. 20 is a flowchart of touch determination to prevent erroneous determination of the multi-touch.

In the case of FIG. 19B, both the first electrostatic capacitance $Cb_1'$ and the second electrostatic capacitance $Cb_2'$ exceed the threshold value THt for touch detection. That is, a single touch is erroneously determined as a multi-touch. FIG. 20 is a flowchart of touch determination to prevent such erroneous determination of the multi-touch.

First, determination is made on whether or not the amount of the water adhering to each of the electrodes E1 and E2 exceeds a predetermined amount (S100). In processing of S100, it may be possible to determine whether or not one of the estimated amounts $\hat{Cw}_1$ and $\hat{Cw}_2$ of the water at the electrodes E1 and E2 are larger than a predetermined threshold value THw2 (larger than a threshold value THw for water detection).

Then, in a case where the amount of the water is less than the predetermined amount (N in S100), the processing shifts to touch determination in which a multi-touch is allowable (S102). Specifically, it is determined that:

(i) no touch is made in a case of $Cb_1' < $ THt and $Cb_2' < $ THt;
(ii) a single touch is made only on E1 in a case of $Cb_1' > $ THt and $Cb_2' < $ THt;
(iii) a single touch is made only on E2 in a case of $Cb_1' < $ THt and $Cb_2' > $ THt; and
(iv) a multi-touch is made on E1 and E2 in a case of $Cb_1' > $ THt and $Cb_2' > $ THt.

In the processing of S100, in a case where the amount of the water is larger than the predetermined amount (Y in S100), the processing shifts to touch determination in which the multi-touch is not allowable (S104).

Each of the first electrostatic capacitance $Cb_1'$ and the second electrostatic capacitance $Cb_2'$ is compared with the threshold value THt for touch detection (S106). In the cases of (i) to (iii), it is determined that a single touch is made under the same condition as that in the case where the multi-touch is allowable.

In a case of (iv) $Cb_1' > $ THt and $Cb_2' > $ THt, following determination is performed.

The determination is made on whether or not a difference $|Cb_1' - Cb_2'|$ between the first electrostatic capacitance $Cb_1'$ and the second electrostatic capacitance $Cb_2'$ is larger than a predetermined threshold value $C_{TH}$ (S108). Then, in a case where the difference $|Cb_1' - Cb_2'|$ is larger than the threshold value Cm (Y in S108), it is determined that a single touch is made on an electrode having a larger value among the first electrostatic capacitance $Cb_1'$ and the second electrostatic capacitance $Cb_2$ (S110).

On the contrary, in a case where the difference $|Cb_1' - Cb_2'|$ is smaller than the predetermined threshold value $C_{TH}$ (N in S106), it is determined that no touch is made on either of the electrodes E1 and E2 among the first electrostatic capacitance $Cb_1'$ and the second electrostatic capacitance $Cb_2'$ (S112).

Figure 21:
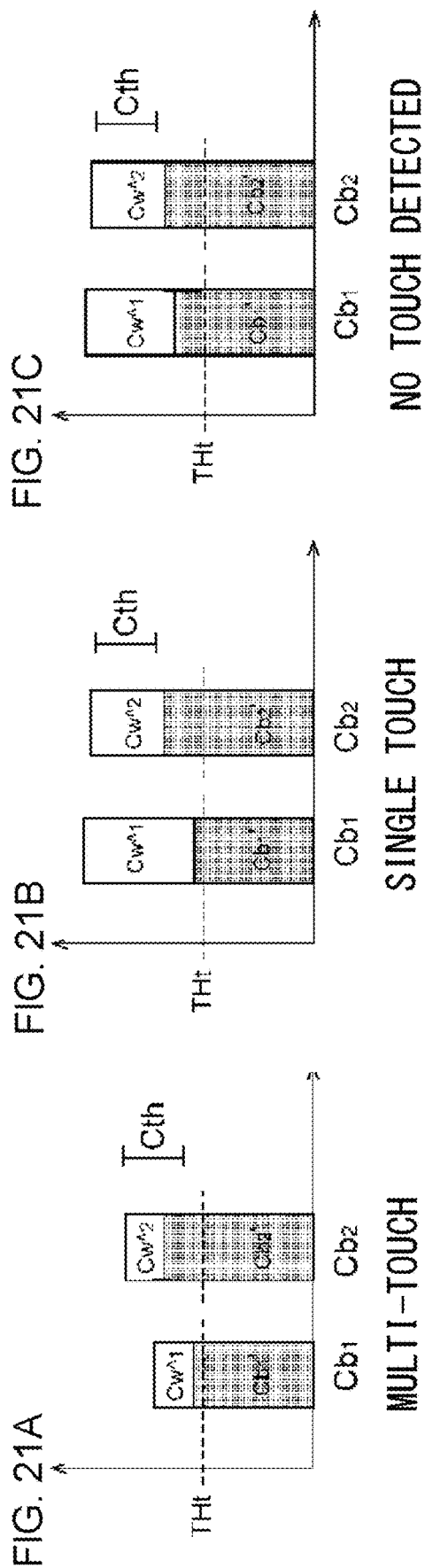
FIGS. 21A to 21C are diagrams to describe other examples of sensing by the touch detection circuit of FIG. 17.

FIGS. 21A to 21C are diagrams to describe determination based on the flowchart of FIG. 20. An example of FIG. 21A is a case of $Cb_1' < $ Cth and $Cb_1' < $ Cth, in which the adhering amount of the water is determined to be less than the predetermined amount, and it is determined that a multi-touch is made.

Each of the examples of FIGS. 21B and 21C is a case of $Cb_1' > $ Cth, in which the adhering amount of the water is larger than the predetermined amount. In FIG. 21B, since the difference between the first electrostatic capacitance $Cb_1'$ and the second electrostatic capacitance $Cb_2'$ is large and $Cb_2' > Cb_1'$ is satisfied, it is determined that a single touch is made on the second electrode E2. In FIG. 21C, since the difference between the first electrostatic capacitance $Cb_1'$ and the second electrostatic capacitance $Cb_2'$ is small, it is determined that no touch is made.

The present invention has been described on the basis of the embodiments. Note that the embodiments are examples and it is understood by those skilled in the art that: various modified examples can be achieved by combining the respective constituent elements and the processes of the processing thereof; and such modified examples are also included in the scope of the present invention. Hereinafter, such modified examples will be described.

Figure 22:
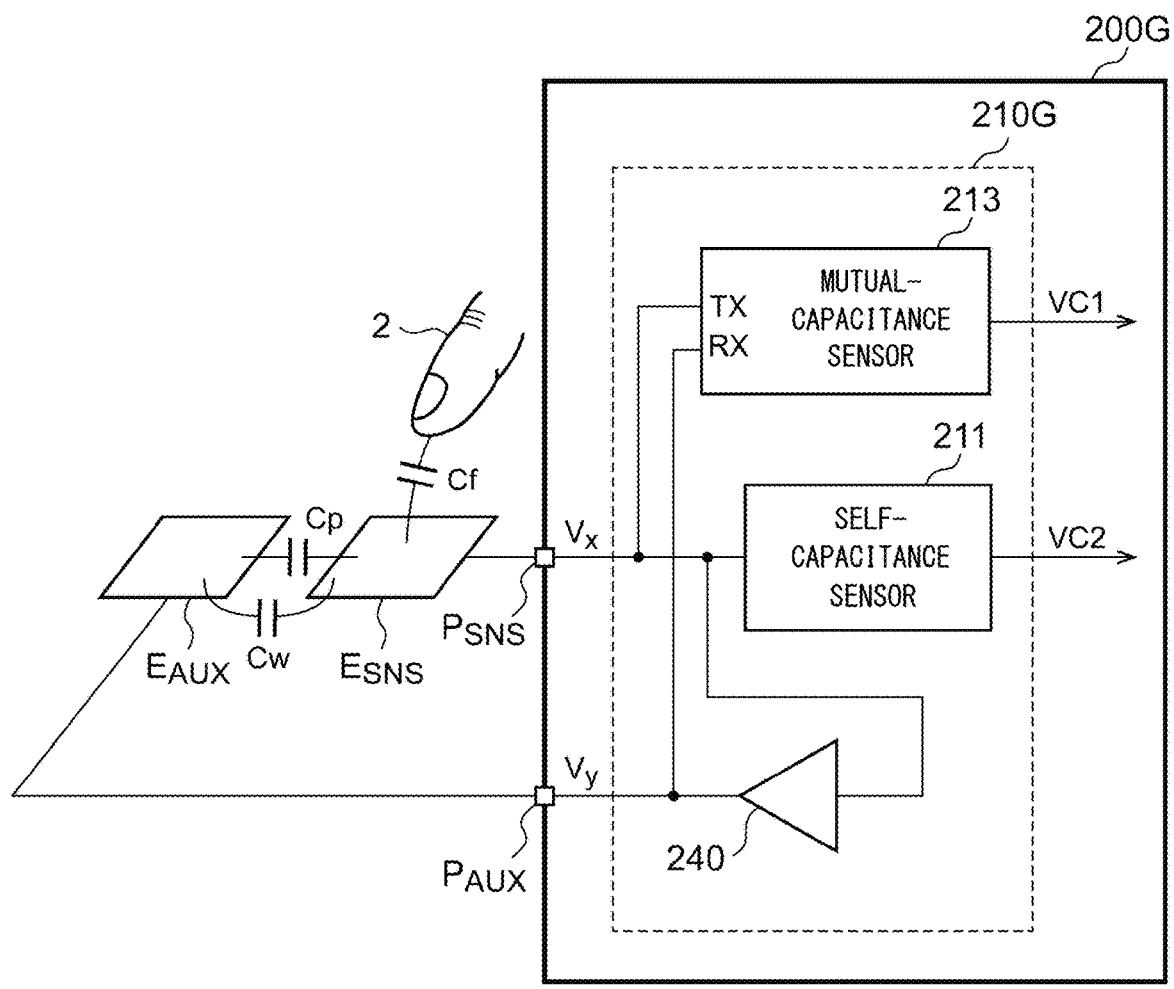
FIG. 22 is a circuit diagram illustrating a modified example of the capacitance sensing circuit.

FIG. 22 is a circuit diagram illustrating a modified example (210G) of the capacitance sensing circuit 210. The capacitance sensing circuit 210G further includes a mutual-capacitance sensor 213. In this modified example, the first electrostatic capacitance Ca (or the third electrostatic capacitance $Ca_2$) is measured by the mutual-capacitance sensor 213. Also, the second electrostatic capacitance Cb (or the fourth electrostatic capacitance $Cb_2$) is measured by the combination of the self-capacitance sensor 211 and the cancel circuit 240.

While the preferred embodiments of the present invention have been described using specific terms, such description is for illustrative purposes only, and it is to be understood that changes and variations may be made without departing from the spirit or scope of the appended claims.

What is claimed is:

1. A touch detection circuit comprising:
a first terminal to which a first electrode is to be coupled;
a second terminal to which a second electrode located adjacent to the first electrode is to be coupled;
a capacitance sensing circuit structured to: (i) sense first electrostatic capacitance formed by the first electrode in a space with a periphery including the second electrode; and (ii) sense, by a self-capacitance method, second electrostatic capacitance formed by the first electrode in a space with a periphery in a state where voltage of the second terminal is made to follow voltage of the first terminal; and
a signal processor structured to detect, on the basis of a difference between the first electrostatic capacitance and the second electrostatic capacitance, water over the first electrode and the second electrode,
wherein the capacitance sensing circuit comprises:
a self-capacitance sensor coupled to the first terminal; and
a cancel circuit having an input node coupled to the first terminal and an output node coupled to the second terminal, and structured to drive the second terminal such that the voltage of the second electrode follows the voltage of the first electrode when it is enabled, and wherein the first electrostatic capacitance is sensed when the cancel circuit is disabled and the second electrostatic capacitance is sensed when the cancel circuit is enabled.

2. The touch detection circuit according to claim 1, wherein the signal processor is structured to correct an error between sensitivity of the capacitance sensing circuit for the first electrostatic capacitance and sensitivity of the capacitance sensing circuit for the second electrostatic capacitance.

3. The touch detection circuit according to claim 1, wherein the signal processor is structured to determine presence/absence of a touch on the first electrode on the basis of the second electrostatic capacitance.

4. The touch detection circuit according to claim 3, wherein for touch determination for a certain frame, the signal processor is structured to generate a correction value on the basis of the second electrostatic capacitance measured in a past frame, to correct at least one of a threshold value for touch detection and the second electrostatic capacitance of a current frame on the basis of the correction value, and to determine presence/absence of a touch on the first electrode on the basis of a comparison result between the second electrostatic capacitance and the threshold value after the correction.

5. The touch detection circuit according to claim 1, wherein a determination condition to determine presence/absence of a touch on the first electrode is changed in accordance with a detection result of the water.

6. The touch detection circuit according to claim 5, wherein a determination condition to determine presence/absence of a touch on the first electrode in a certain frame is changed in accordance with a detection result of the water in a frame prior to the certain frame.

7. The touch detection circuit according to claim 1, wherein the capacitance sensing circuit is structured to sense (iii) third electrostatic capacitance formed by the second electrode in a space with a periphery including the first electrode, and (iv) to sense, by the self-capacitance method, fourth electrostatic capacitance formed by the second electrode in a space with a periphery in a state where the voltage of the first terminal is made to follow the voltage of the second terminal, in addition to the first electrostatic capacitance and the second electrostatic capacitance.

8. The touch detection circuit according to claim 7, further comprising a selector provided between the capacitance sensing circuit and a portion including the first terminal and the second terminal, and structured to switch a coupling relation of the capacitance sensing circuit between the first terminal and the second terminal.

9. The touch detection circuit according to claim 1, wherein the touch detection circuit is integrated on one semiconductor integrated circuit.

10. An input device comprising a touch detection circuit according to claim 1.

11. An electronic apparatus comprising an input device according to claim 10.

12. The touch detection circuit according to claim 1, wherein the cancel circuit comprises:
a buffer having an input node coupled to the first terminal;
a drive auxiliary circuit coupled to the second terminal and structured to change the voltage at the second terminal; and
a first switch coupled between an output node of the buffer and the drive auxiliary circuit.

13. The touch detection circuit according to claim 12, wherein the drive auxiliary circuit comprises a second switch coupled between the second terminal and a ground line.

14. The touch detection circuit according to claim 13, wherein the drive auxiliary circuit further comprises a third switch coupled between the second terminal and a power supply line.

* * * * *